(12) United States Patent  (10) Patent No.: US 7,013,393 B1
Stevens  (45) Date of Patent: Mar. 14, 2006

(54) UNIVERSAL INTELLIGENT CARD FOR SECURE ACCESS TO SYSTEM FUNCTIONS

(76) Inventor: Pierre Stevens, 21047 Escondido Way, Boca Raton, FL (US) 33433

( * ) Notice: Subject to any disclaimer, the term of this patent is extended or adjusted under 35 U.S.C. 154(b) by 0 days.

(21) Appl. No.: 09/468,621

(22) Filed: Dec. 21, 1999

(51) Int. Cl.
G06F 11/30 (2006.01)
G06F 12/14 (2006.01)
H04L 9/00 (2006.01)
H04L 9/32 (2006.01)

(52) U.S. Cl. ............... 713/200; 713/201; 379/257; 379/93.37; 379/93.26; 379/361; 379/418; 379/357.03; 379/354; 235/91 E; 235/380

(58) Field of Classification Search ............ 379/40, 379/51, 357.03, 361, 257, 93.37, 93.26, 418, 379/354; 235/91 E; 380/258, 266; 713/200, 713/201; 238/91 E, 380
See application file for complete search history.

(56) References Cited

U.S. PATENT DOCUMENTS

| 4,995,077 | A | | 2/1991 | Malinowski |
| 5,136,632 | A | | 8/1992 | Bernard |
| 5,181,744 | A | | 1/1993 | Betheil |
| 5,182,767 | A | | 1/1993 | Bernard |
| 5,216,716 | A | | 6/1993 | Bernard |
| 5,249,220 | A | | 9/1993 | Moskowitz et al. |
| 5,343,519 | A | | 8/1994 | Feldman |
| 5,377,263 | A | | 12/1994 | Bazemore et al. |
| 5,386,479 | A | * | 1/1995 | Hersh .................. 381/190 |
| 5,406,619 | A | * | 4/1995 | Akhteruzzaman et al. ................ 379/93.02 |
| 5,452,352 | A | | 9/1995 | Talton |
| 5,524,072 | A | | 6/1996 | Labaton et al. |
| 5,539,819 | A | | 7/1996 | Sonoyama et al. |
| 5,583,933 | A | * | 12/1996 | Mark .................. 379/357.04 |
| 5,636,270 | A | | 6/1997 | Davey |
| 5,636,271 | A | * | 6/1997 | Paterno et al. ........ 379/357.03 |
| 5,671,271 | A | | 9/1997 | Henderson et al. |

(Continued)

FOREIGN PATENT DOCUMENTS

FR 2739513 5/1998
FR 2739235 6/1998

(Continued)

*Primary Examiner*—Kim Vu
*Assistant Examiner*—Beemnet W Dada

(57) ABSTRACT

A method and apparatus for secure access to secured system functions utilizing a universal access card. The card includes a bank of tuned amplifier circuits and tuned audio transducers to maximize audio output power from the card, such as for telephone communications. The card includes a variety of other interfaces for the user to communicate with a secure access central system. The card includes a keypad, signature input pad, voice audio input, and fingerprint input, to capture data from a user to determine whether the user is an authorized user. The user utilizes the card to conduct a secure access authorization process with the central. After the card and user are authenticated, the user can access certain functions of a system.

21 Claims, 13 Drawing Sheets

U.S. PATENT DOCUMENTS

| | | | |
|---|---|---|---|
| 5,714,741 A * | 2/1998 | Pieterse et al. | 235/380 |
| 5,732,133 A | 3/1998 | Mark | |
| 5,742,684 A | 4/1998 | Labaton et al. | |
| 5,748,713 A | 5/1998 | Kovacs, Jr. | |
| 5,809,425 A | 9/1998 | Colwell et al. | |
| 5,818,930 A | 10/1998 | Mark | |
| 5,825,872 A | 10/1998 | Mashinsky | |
| 5,901,217 A | 5/1999 | Kanbar | |
| 5,963,637 A * | 10/1999 | Arzoumanian | 379/357.03 |
| 6,016,476 A * | 1/2000 | Maes et al. | 705/1 |
| 6,748,359 B1 * | 6/2004 | Colnot | 704/270 |
| 2001/0052077 A1 * | 12/2001 | Fung et al. | 713/184 |

FOREIGN PATENT DOCUMENTS

| | | |
|---|---|---|
| WO | WO 95/12368 | 4/1996 |
| WO | WO 96/10880 | 4/1996 |
| WO | WO 98/13971 | 4/1998 |
| WO | WO 98/13972 | 4/1998 |
| WO | WO 98/13984 | 4/1998 |
| WO | WO 98/13990 | 4/1998 |
| WO | WO 98/13991 | 4/1998 |
| WO | WO 98/21880 | 5/1998 |
| WO | WO 99/22362 | 5/1999 |
| WO | WO 99/27676 | 6/1999 |

* cited by examiner

UNIVERSAL INTELLIGENT CARD FOR SECURE ACCESS TO SYSTEM FUNCTIONS

BACKGROUND OF THE INVENTION

1. Field of the Invention

This invention relates in general to methods for determining the authority of an unknown user to access certain function of a computing system and to permit access only to an authorized user. More particularly, this invention relates to a method and apparatus for communicating with a user using a secure access device, such as a universal access card, that may be remotely located across different types of networks, such as telecommunication, financial, wireless, satellite, Internet, wide area, local, and dedicated lines, and to determine the authority of an unknown user, such as by identifying, verifying, and/or authenticating the user, to permit user access to secured access functions of a computing system.

2. Description of the Prior Art

Conventional computing systems typically accept user entered information, such as a password, or a Personal Identification Number (PIN), to identify an authorized user before permitting the user to access certain secured functions in the computer system. Users typically type the information on a keyboard or keypad at a computer terminal device or at a telephone. Additionally, users may carry magnetic strip cards which can be swiped through a card reader terminal to identify some secure information encoded into the magnetic strip for identifying the user to a system that is remotely coupled to the card reader terminal. In the past, conventional systems have used the password, and optionally in combination with receiving information from a magnetic strip card, as a means of identifying an authorized user before permitting access to certain secured functions of the system.

For example, a financial communication system that permits certain transactions with user's funds may permit access after a user enters a magnetic strip card into a card reader and further enters a PIN on a keypad provided at an automatic teller machine, for example. The use of such a magnetic strip card unfortunately requires a special terminal device to read the card at each location where the magnetic strip card is to be used. Further, the magnetic strip on a magnetic strip card can easily be read by a hand held reader device that is becoming commonly available among criminals. The criminals can then use this information to create fraudulent transactions using the victim's account at the financial institution to pay for goods and services that were never authorized by the true authorized user of the account.

Additionally, users are reluctant to give out their PIN number to be able to use their card with a card reader because the PIN number, or similar password, is easily observed and captured by a thief while an authorized user utilizes the card, such as using a keypad to enter the secret code during a transaction at a point of sale. As another example, telephone cards are regularly used by travelers to access their accounts and place long distance telephone calls. The user enters a PIN or pass code on the telephone keypad to access certain secured functions pertaining to their account. It is common today to have spotters watch telephone callers using public telephones and to capture the secret pass code from an unwary traveler. The criminal then distributes this secret code to confederates and associates that use it to access the telephone system and place long distance calls that, unfortunately, end up being paid by the service provider or the unwary traveler. Therefore, using a simple PIN or passcode alone to protect access to secured functions of a system is becoming undesirable by consumers and service providers. Therefore, it is unfortunate that a more secure, yet user friendly, method and apparatus for accessing secured functions of a system has not been available.

Accordingly, there is a need for a method and apparatus to eliminate those specific disadvantages of the prior art as discussed above, and particularly to significantly enhance the security of access to system functions by unknown users that may be remotely located relative to the system.

DESCRIPTION OF THE PREFERRED EMBODIMENTS

The present invention solves the aforementioned problems by providing a secure access device, preferably in a universal access card form, as will be discussed in detail below. The secure access device allows user friendly and secure access to functions of a system by remote users.

Figure 1:
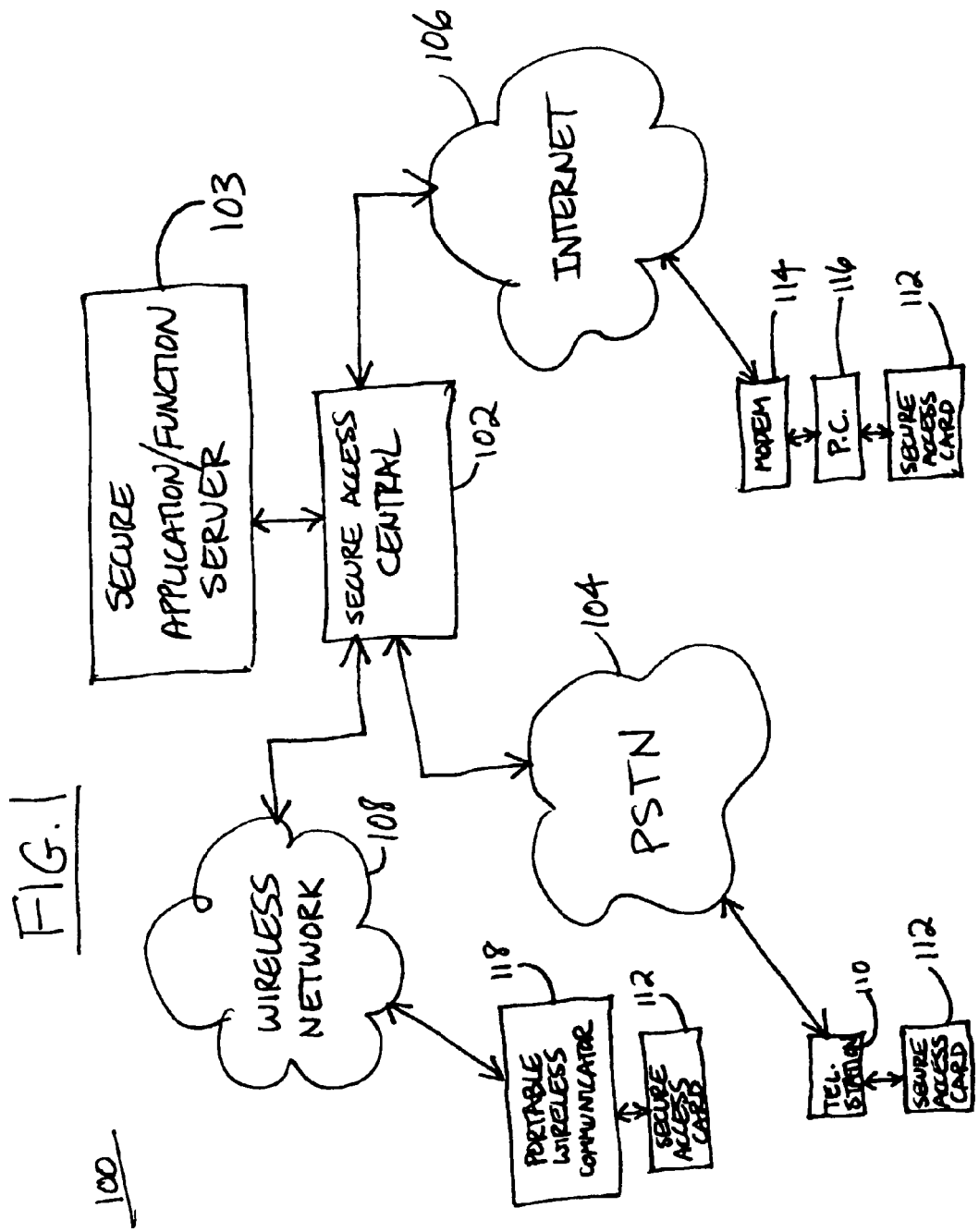
FIG. 1 is a block diagram of an exemplary computing system according to a preferred embodiment of the present invention.

Referring to FIG. 1, an exemplary secure access system is shown according to a preferred embodiment of the present invention. The system 100 comprises a secure access central system 102 that is communicatively coupled to a secure application/function server 103. The secure access central system 102 handles a user access authorization sequence and when the user is authorized then passes the user communication and control to the secure application/function server 103 to perform certain secured access functions that the user is authorized to access.

Different populations of users may communicate with the secure access central system 102 via different networks and communication media. For example, certain users may communicate via the public switched telephone network (PSTN) 104. Other users, for example, may communicate via the Internet 106 or other such worldwide area network. As a third example, certain users may communicate via a wireless communication network 108, such as via a cellular system, a two-way paging system, a radio communication system, a satellite communication system, an infrared communication system, an ultrasonic communication system, or a combination thereof or other similar wireless communication systems.

In the case of users communicating via the PSTN 104, such users typically utilize telephone stations 110 such as telephones, pay phones, smart phones, and other such telephone communication devices. A user, in a preferred embodiment, utilizes a secure access card 112 to communicate via the telephone station 110 and the PSTN 104 to conduct a secure access authorization sequence with the secure access central system 102, as will be discussed in detail below.

In a second example, a user communicates via the Internet 106 by utilizing a modem device 114 electrically coupled to a personal computer station 116. The user can conduct a secure access authorization sequence with the secure access central system 102 by utilizing a secure access card 112 as will be discussed in detail below.

As a third example, a user can access the secure access central system 102 via the wireless network 108 utilizing a portable wireless communicator 118 such as a cellular telephone. The user can conduct a secure access authorization sequence with a secure access central system 102 by using the wireless access card 112 and the portable wireless communicator 118 via the wireless network 108 as will be discussed in more detail below.

Figure 2:
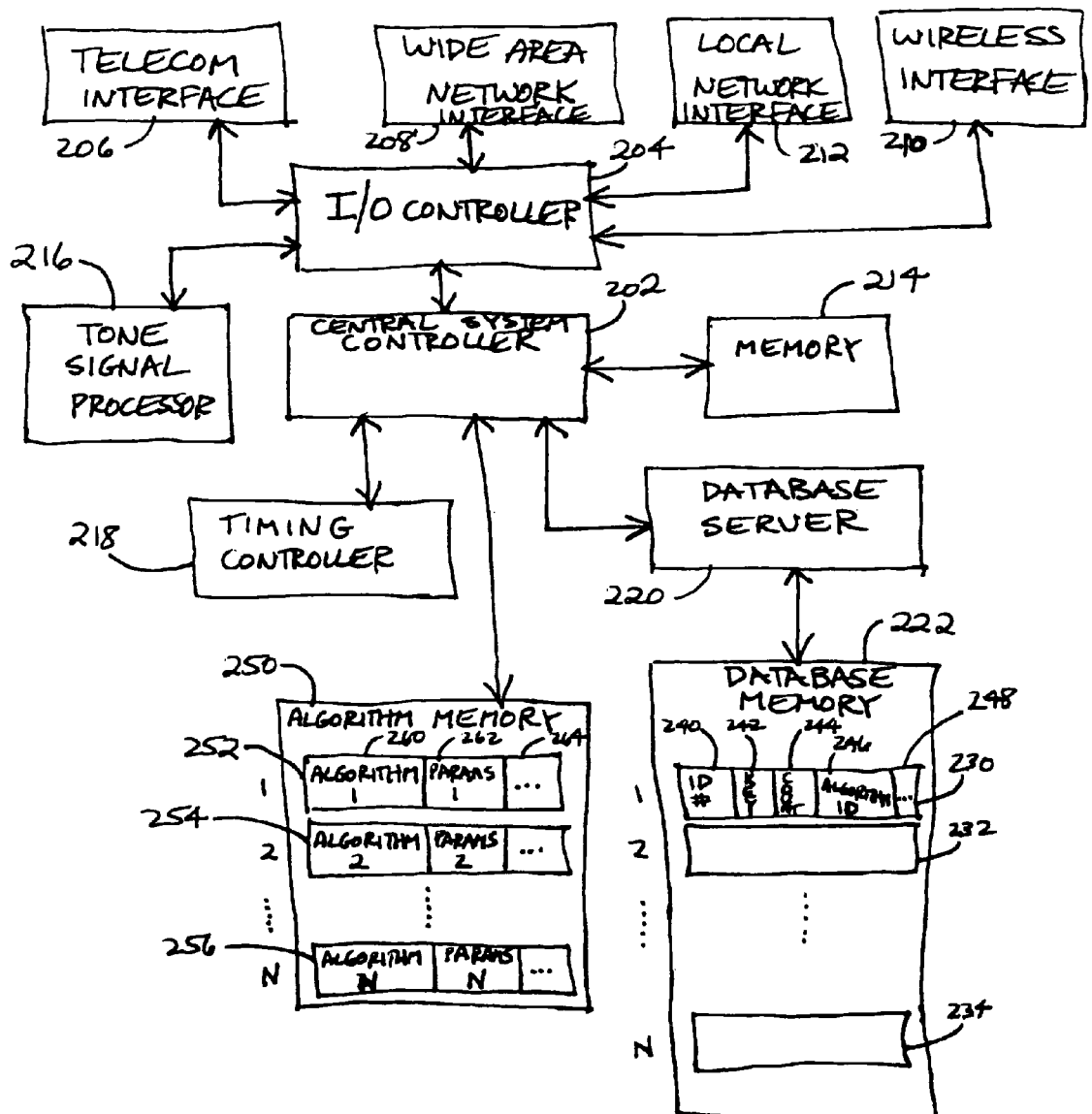
FIG. 2 is a more detailed block diagram of the secure access central system of FIG. 1 according to a preferred embodiment of the present invention.

Referring to FIG. 2, the secure access central system 102 includes a central system controller 202 to control its main functions for automatically performing secure access authorization sequences with users of the main computing system 100. An I/O controller 204 communicates with a central system controller 202 to control the communication with users across a variety of interfaces. For example, a telecommunication interface 206 communicates with the PSTN 104 to allow communication with users via the PSTN 104. The wide area network interface 208 communicates with the Internet 106 based users. The wireless interface 210 communicates via the wireless network 108 with users of wireless communication devices 118. As another example, a local network interface 212 allows communication with a local area network that may be connected with local user access stations for communicating with users. In this example, these local access stations may comprise automatic teller machines (ATM) located in a particular geographic area. Alternatively, for example, the local access stations may comprise a local area network of personal computers such as in an office area.

The central system controller 202 is electrically coupled to a memory 214, such as a random access memory, for storing information such as may be necessary for performing secure access functions while communicating with users of the computing system 100. A tone signal processor 216 is electrically coupled to the I/O controller 204 for processing tone signals that are communicated to/from users such as during a secure access authorization sequence, as will be discussed below. A timing controller 218 is electrically coupled to the central system controller 202 for providing time controlled functions at the secure access central system 102 such as for communicating with users during secure access authorization sequences, as will be discussed below. A database server 220 is electrically coupled to the central system controller 202 and handles database access functions such as looking up user records for authorized users of the computing system 100. A database memory 222 is electrically coupled to the database server 220 and provides storage such as for a collection of user records 230, 232, 234. Each user record includes fields of information pertaining to the particular user associated with the record. This field information may include, for example, a user ID number 240 such as a serial number that is matched to a serial number of a secure access card 112 for a particular user. The user record preferably also includes a security key 242 associated with the particular user.

Further, a count field 244 is used to keep track of the current number of times that the particular user has performed a secure access authorization sequence with the secure access central 102. This count 244 can be used by the secure access central 102 to dynamically vary its operation with a particular user during repeated attempts to conduct secure access authorization sequences. This is an important feature of the operation of the secure access central system 102 to significantly deter fraudulent use of the secured access functions of the system 100 by unauthorized users, as will be discussed in more detail below. An algorithm ID field 246 provides a pointer to an algorithm stored in the algorithm memory 250. Other information fields 248 can also be included in a user record for alternative implementations of the secure access central system 102 as will be discussed below. The algorithm memory 250 is electrically coupled to the central system controller 202 and provides storage of a collection of algorithms 252, 254, 256, that can be utilized by the secure access central system 102 for communicating with users.

Each of the user records 230, 232, 234, includes the algorithm ID field 246 to point to one of these algorithms 252, 254, 256, that is associated with each authorized user of the computing system 100. Each of the algorithms 252, 254, 256, is defined by algorithm code 260, algorithm parameters 262, and other associated algorithm information 264 that can be used to perform the particular algorithm such as for conducting a secure access authorization sequence with a particular user as will be discussed below.

Figure 3:
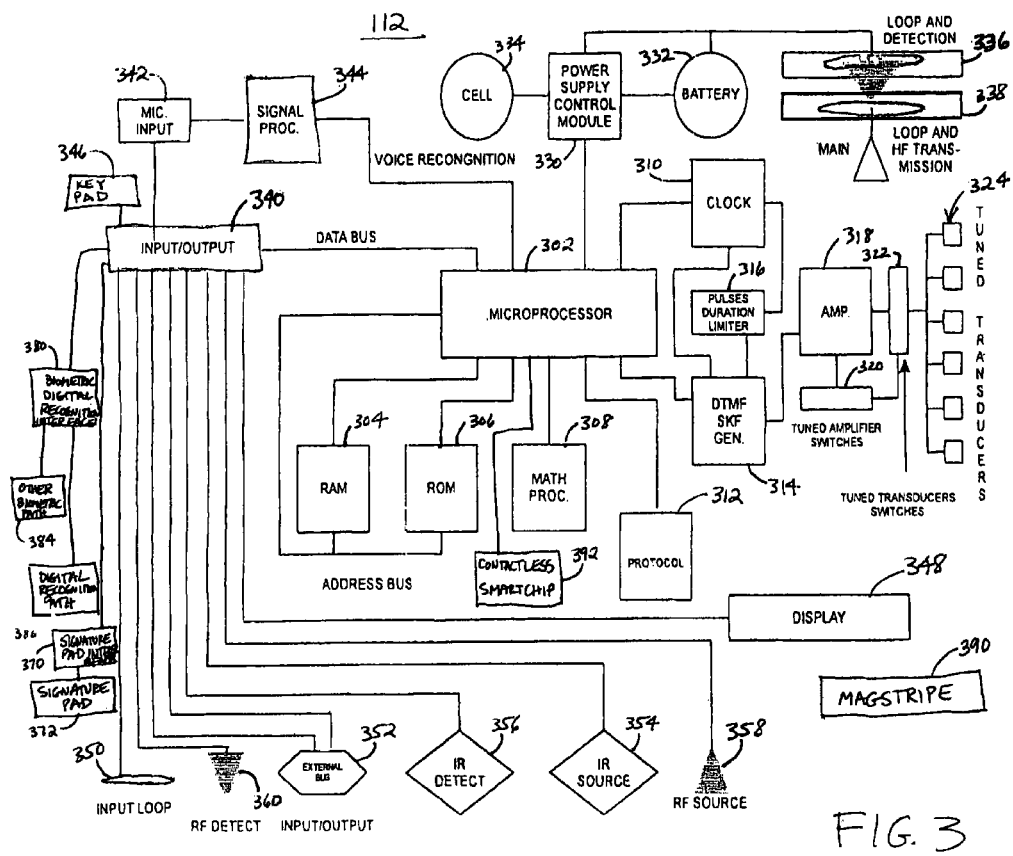
FIG. 3 is a block diagram of an exemplary universal access card in accordance with a preferred embodiment of the present invention.

Referring now to FIG. 3, an exemplary universal secure access card 112 is illustrated in accordance with a preferred embodiment of the present invention. The universal secure access card ("universal card") 112 preferably is constructed with ISO thickness and with a credit card form factor. This enhances the friendly usability by a user typically accustomed to carrying cards in a wallet or purse. The universal card 112 preferably includes a magnetic strip (or magstripe) 390 on an outer surface for the card 112 (not shown). The magnetic strip 390 is programmed with user information, similar to conventional credit cards, so it can be read by a conventional magnetic card reader. Additionally, the universal card 112 preferably includes a SmartCard chip interface (392), that could be either contact or contactless according to the application and is shown as a contactless interface in this example, to allow the card 112 to be used by conventional SmartCard readers. The universal card 112, in this way, will be usable with most conventional card reading infrastructure to allow the user to benefit from compatibility with existing infrastructure. A radio tag (not shown) could be integrated in the card 112 when the card 112 is associated with a transportation application such as Electronic Payment Services (Transit Fares, Road Tolls, Parking Payment) and Traffic Management, Emergency Management, Enforcement Agencies, and Remote Traveler Support.

A microprocessor 302 controls the operations of the universal card 112. The universal card 112 includes volatile and non-volatile memories, such as random access memory 304 and read only memory 306, that are electrically coupled to the microprocessor 302 for storing data used by the microprocessor 302 such as for controlling the functions during a secure access authorization sequence between the universal card 112 and the secure access central system 102. Preferably, a math coprocessor 308 is electrically coupled to the microprocessor 302 for performing precision mathematical calculations such as may be necessary by particular algorithms utilized in communication during a secure access authorization sequence. A timing reference or clock 310 is electrically coupled to the microprocessor 302 and can be utilized for performing time based functions as will be discussed below. A protocol memory 312 comprises non-volatile memory such as read only memory or flash memory for storing a particular protocol algorithm that can be used by the universal card 112 for communicating with the secure access central system 102 during a secure access authorization sequence. The protocol algorithm can be stored in the protocol memory 312 at time of manufacture of the universal card 112 and/or can be dynamically programmed into the protocol memory 312 at a later time such as during use by a user of the computing system 100. The protocol memory 312 additionally stores related parameters and other associated information pertaining to the protocol used by the universal card 112.

The universal card 112 includes a tone generator 314 that can generate multiple tones such as to be used with DTMS communication, multi-tone communication, modem communication or other similar tone communication. A pulse duration limitter 316 is electrically coupled to the tone generator 314 and to the clock 310 for precisely timing the tone duration, e.g., the start and stop times for particular tones. The microprocessor 302 can control this tone sequence utilizing the pulse duration limitter 316 for accurate tone timing. The tone generator 314 is electrically coupled to an amplifier circuit 318 for providing amplified tone signal output capable of being transmitted through specific interfaces for communication with the secure access central system as will be discussed below.

To generate significant tone amplitude for a particular communication application, the universal card includes at least one, and preferably a bank of tuned transducers 324 that are optimally tuned for certain frequency bands to generate maximum audio output amplitude. Each of these tuned transducers can comprise, for example, a piezo electric transducer mechanism that has been mechanically tuned to a specific frequency band for substantially maximum acoustic output of audio signal.

The microprocessor 302 can selectively control the amplifier circuit 318 and can select at least one tuned transducer by controlling the tuned amplifier switches 320 and the tuned transducer switches 322. By combining a selected amplifier circuit with a selected at least one tuned transducer from the bank of tuned transducers 324, the universal card can generate maximum audio signal output from the bank of transducers 324. Typically, each of the tuned transducers 324 is mechanically tuned to oscillate about its resonant frequency for maximum audio power output. Different amplifier output from the amplifying circuit 318, e.g., signal amplitude, tone frequency, spacing between tones, and tone duration, may be selected to match the particular audio power output desired from a selected transducer from the bank of tuned transducers 324. In this way, the processor 302 controls a variable tone sequence, e.g., tone duration, space between tones, frequency of each tone, and relative amplitude of each tone, while maximizing audio power output for reliable delivery of tones to secure access central system 102.

Maximizing power output of the tuned transducers 324 is an important feature of the present invention with particular value in applications that utilize audio coupling into a network interface to communicate with the secure access central system. For example, via a telephone station, the universal card 112 can be used to generate tone audio output that is audio coupled to the mouthpiece of a telephone station. Since this audio coupling may be less than perfect in most applications, it is important to transmit maximum audio output power to couple into the telephone mouthpiece receiver in less than ideal conditions. For example, in an airport or other public location where there is significant ambient noise, a user of the universal card 112 may be able to hold the card audio output in close proximity to the telephone mouthpiece and still accomplish a reliable delivery of tone signals via the telephone station to the secure access central system.

The universal card 112 through this novel use of selective tone generation circuits and transducers is able to provide a significant tone audio power output for communication, such as via a telephone network, while minimizing the drain on the internal battery power source of the universal card 112. Additionally, the pulse duration limitter 316 can limit the duration of particular tones to a minimum duration required for reliable delivery of the tone signal to the secure access central system. By minimizing the tone duration to its absolute minimum for reliable communication, the universal card 112 additionally conserves battery power and thereby extends battery life, which is an important feature desired by most users.

Alternatively, the tone output from the universal card can be communicated totally via an electronic interface, such as via an electrical telephone interconnection. For example, a telephone interface circuit in the universal card (not shown) can electrically interface to a telephone line. In one preferred embodiment, an RJ11 interface plug can be electrically coupled to electrical contacts on the universal card 112 allowing a user to connect the universal card 112 to an RJ11 jack that is commonly available as an interface to a telephone network.

The universal card 112 includes a power control module 330 that controls the power supply to the electrical circuits on the universal card 112. A battery power supply 332 provides the normal power supply for powering electrical circuits. A backup battery cell 334 provides backup power in the event that the normal power source 332 is substantially depleted. The power control module 330 handles the power supply monitoring function and switching to the backup cell 334 when the battery 332 is depleted below a certain level. Additionally, the power control module 330 provides a signal to the microprocessor 302 to indicate when the power is low and that the battery 332 needs to be either replaced, in the event that the battery 332 is a replaceable battery, or that it needs to be recharged in the event that the battery 332 is a rechargeable power source.

Preferably, the battery 332 comprises a rechargeable battery that can be recharged via a recharging interface 336 on the universal card 112 that meets with a recharging interface 338 at a recharging station via a contactless interface arrangement. Preferably, an inductive loop interface 336 can receive a power signal from a contactless loop interface 338 at a recharging station. The power signal can be delivered to the universal card 112 via the contactless interface arrangement to recharge the rechargeable battery 332. The power control module 330 additionally monitors the recharging function for recharging the battery 332 and can selectively switch the rechargeable battery 332 out of a recharging cycle and back into a power mode to supply power to the electrical circuits in the universal card 112.

A set of keys or keypad 346 are available on the outer surface of the universal card 112 to receive user input. The input signals via the keypad 346 are received by the microprocessor 302 via an input output interface 340. Additionally, a display 348, such as a liquid crystal display, provides a visual display output for displaying information usable by the user or by an eternal device that can optically scan the display 348. For example, the display 348 can provide a message to a user of the universal card 112, while providing a bar code information that can be scanned by optical scanner coupled to a personal computer or other computing station.

A voice input interface comprises a microphone input circuit 342 electrically coupled to a signal processor 344 to process the audio signals and to convert these signals to digital data representative of the audio input at the voice input interface. The signal processor 344 couples this digital data to the microprocessor 302. The microprocessor 302 utilizes the digital data from the signal processor 344 to control functions of the universal 112 and to store information in memory in the universal card 112 as may be part of a particular application of the universal card 112. The microprocessor 302 controls the microphone input 342 via the input/output interface 340. In this way, the microprocessor 302 can selectively receive voice input, for example, from a user of the universal card 112. In one alternative embodiment, the microprocessor 302 compares the audio input digital data to at least one stored voice template in the card 112 to determine whether the user's voice audio input matches a prestored template thereby indicating an authorized user. In another alternative embodiment, the audio input digital data can be forwarded to the secure access central 102 (see FIG. 1) to determine at the central 102 whether the user of the card 112 is an authorized user of the system 100.

The universal card 112 can additionally communicate with alternative interfaces that may be available in particular applications. For example, the input output interface 340 is coupled to an input loop 350 that can receive local wireless transmission of signals from another device. For example, a programming station can deliver contactless data via the input loop 350 and the input output interface 340 to program information into the universal card 112. A programming sequence, for example, may reprogram at least a portion of the protocol memory 312 and may reprogram a non-volatile memory such as program memory 306 which is shown in FIG. 3 as a read only memory but that may be generally any type of non-volatile memory such as a flash memory or other re-programmable memory device.

The input loop interface 350 can generally be used to receive information signals that are transmitted from another device via a contactless interface with the universal card 112. For example, the universal card 112 can be controlled by a personal computer or other computing device via a contactless interface that transmits wireless signals to the input loop interface 350 and that are received by the microprocessor controller 302.

Alternatively, an external bus interface 352 is electrically coupled to the input output interface 340 to allow external devices to be electrically coupled to the universal card 112. For example, an RS 422 interface can communicate from an internal computing device to the universal card 112 via the external bus interface 352 to allow reliable communication of signals between the devices.

In another alternative interface, an optical communication interface preferably utilizing infrared signaling can deliver information signals between the universal card 112 in an external computing device. IR source 354 and IR detector 356 can transmit and receive, respectively, these infrared signals to allow communication between the universal card 112 in an external computing device via the wireless infrared interface.

In another exemplary interface, the universal card 112 includes radio frequency circuits for transmitting information signals and for receiving information signals via a wireless RF communication interface. RF transmitting circuits 358 are electrically coupled to the input output interface 340 and allow transmission of information signals via an RF channel. RF receiving circuits 360 are electrically coupled to the input output interface 340 and allow reception of information signals from the RF channel. In this way, the universal card 112 can transmit and/or receive information signals to and/or from an external device via a wireless RF communication channel.

In another exemplary interface, the card 112 includes a signature pad interface 370 electrically coupled to a signature pad 372 disposed on a surface of the card 112 that is accessible by a user thereof. The microprocessor 302 receives captured digital information from the signature pad interface 370 after a user writes a signature on the signature pad 372. Typically, the user can use a stylus to write signature information onto the pad 372. However, a variety of instruments may be used to write on the pad 372, such as a pen or a pencil or even a user's finger. The structure and operation of a signature pad is well known by those of ordinary skill in the art. In one alternative embodiment, the microprocessor 302 compares receives captured digital information from the signature pad interface 370 to at least one stored signature template in the card 112 to determine whether the user's signature input matches a prestored signature template thereby indicating an authorized user. In another alternative embodiment, the signature input data can be forwarded to the secure access central 102 (see FIG. 1) to determine at the central 102 whether the user of the card 112 is an authorized user of the system 100.

In another exemplary interface, the card 112 includes a biometric digital recognition interface 380 electrically coupled to a digital recognition input 382. The input 382, in one preferred embodiment of the present invention, comprises an input pad that can be used to capture a user's finger print. The input/output interface 340 is electrically coupled to the biometric digital recognition interface 380 thereby allowing the microprocessor 302 to receive a digital representation of a user's finger print, such as a thumb print, from the digital recognition input 382. The finger print data captured by the microprocessor 302 allows comparison with prestored finger print template data in memory 306 to authenticate the user of the card 112. Alternatively, the microprocessor 302 can store captured finger print data and forward the captured finger print data to the secure access central 102 (see FIG. 1) to determine at the central 102 whether the user of the card 112 is an authorized user of the system 100. Optionally, an additional biometric path 384 can be electrically coupled to the biometric digital recognition interface 380 to capture other user characteristic information to further assist in recognizing an authorized user of the card 112 in a manner that is well known to those of ordinary skill in the art.

Figure 4:
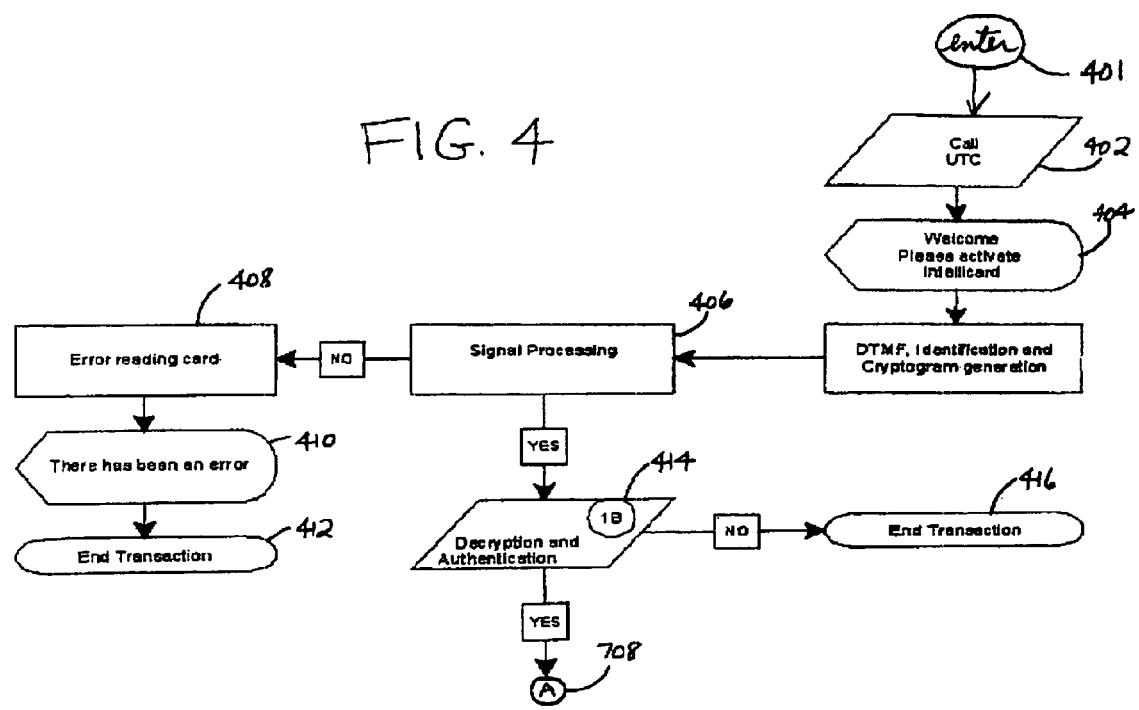
FIGS. 4, 5, and 6, constitute an operational flow diagram illustrating operations for the exemplary system shown in FIG. 1 according to a preferred embodiment of the present invention.
Figure 5:
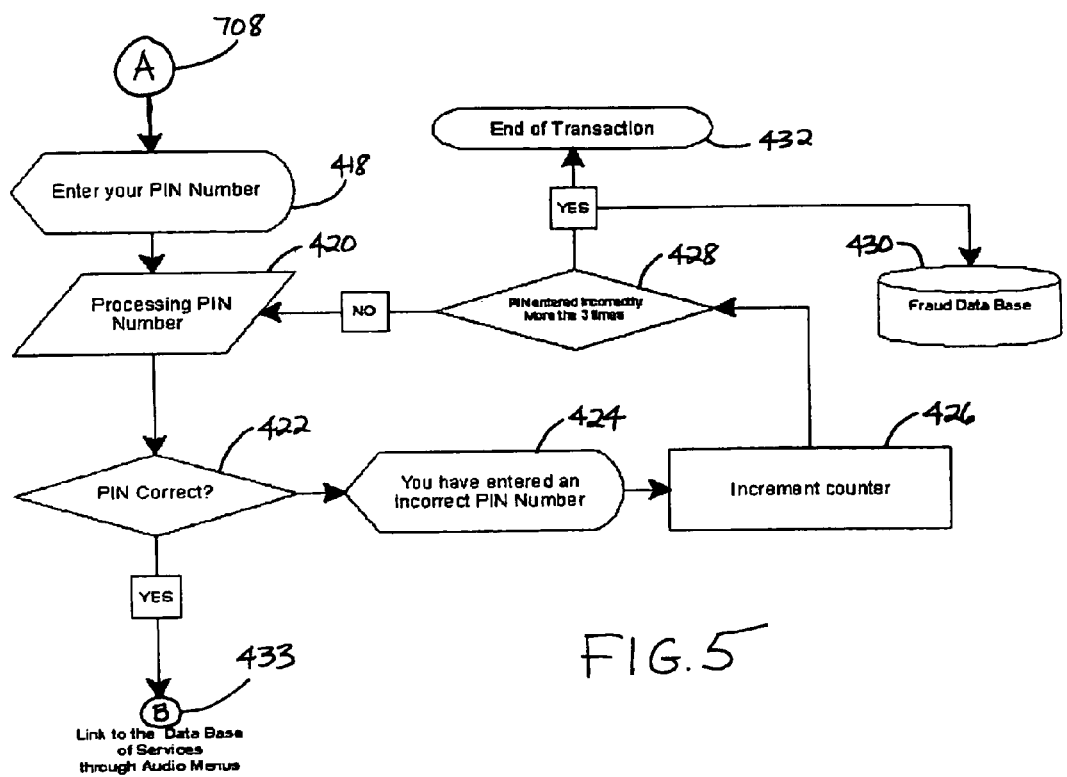
Figure 6:
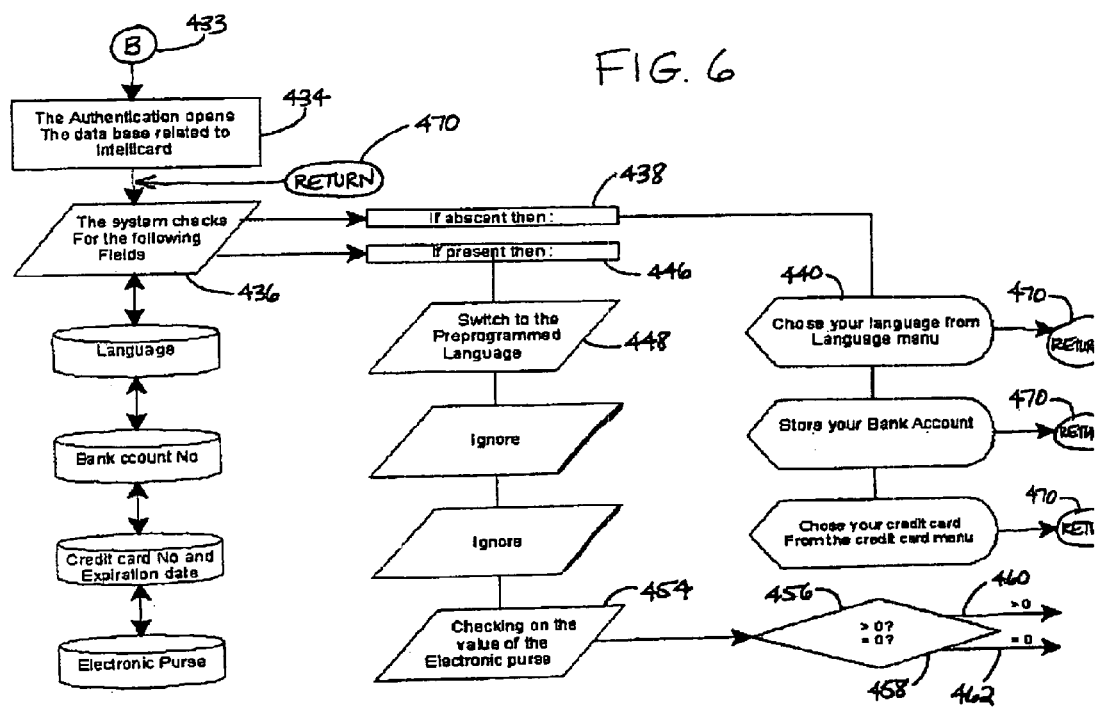

Referring to FIGS. 4, 5, and 6, an operational sequence for the system 100 is shown according to a preferred embodiment of the present invention. In this preferred example, the user uses the universal card 112 to communicate via the PSTN 104 to access secured access functions at the secure application/function server 103. Preferably, the user initiates the communication by placing a call using the telephone station 110. Preferably, at steps 401 and 402, the user enters user input via the keypad 346 to access functions of the universal card 112. For example, the user may enter a password that identifies the user to the universal card 112 thereby allowing the user to place a call utilizing the universal card 112. Additionally, this password protection helps to deter fraudulent access to a universal card's functions by unauthorized users. Therefore, after the user enters a password via the keypad 346, in the preferred embodiment, the universal card 112 is located in close proximity to the receiver in the mouthpiece of the telephone handset and an activation code is entered by the user via the keypad 346 to automatically dial out DTMF digits from the audio output interface 324 of the universal card 112 into the telephone receiver and into the PSTN 104. This automatic dialing feature using the universal card 112 adds a level of security by preventing spotters and other unauthorized users from visually capturing a telephone number that is being dialed by the user to access the secured access functions of the system 100. Alternatively, however, a user may place a call in a more conventional fashion such as by pressing keys in a telephone unit 110 to originate the call.

Once the call has been placed, at step 402, then the secure access central system 102 prompts the user with an audio message, at step 404. The message informs the user that a connection has been made with the system 102 and that an authorization sequence has commenced. At this point, the user, in response to the prompt, may enter additional user input via the keypad 346 to activate the user's universal card 112, also known as the Intellicard. Alternatively, in one example, the user may enter voice commands and information via the voice input interface through the microphone input 342. The universal card 112 recognizes the user's voice commands and is able to authenticate the user for access to certain secured access functions. As a second exemplary alternative, the user may enter a user signature via the signature input pad 372. In one mode, the universal card 112 recognizes the user's signature and is able to authenticate the user for access to certain secured access functions. As a third exemplary alternative, the user may locate a thumb, or other finger, at the digital recognition input pad 382 and the card 112 can capture finger print digital data to authenticate the user for access to certain secured access functions. In one mode, the universal card 112 recognizes the user's finger print and is able to authenticate the user for access to certain secured access functions. The universal card 112 then transmits a secure access tone sequence or string to identify the universal card 112 to the secure access central system 102.

Figure 8:
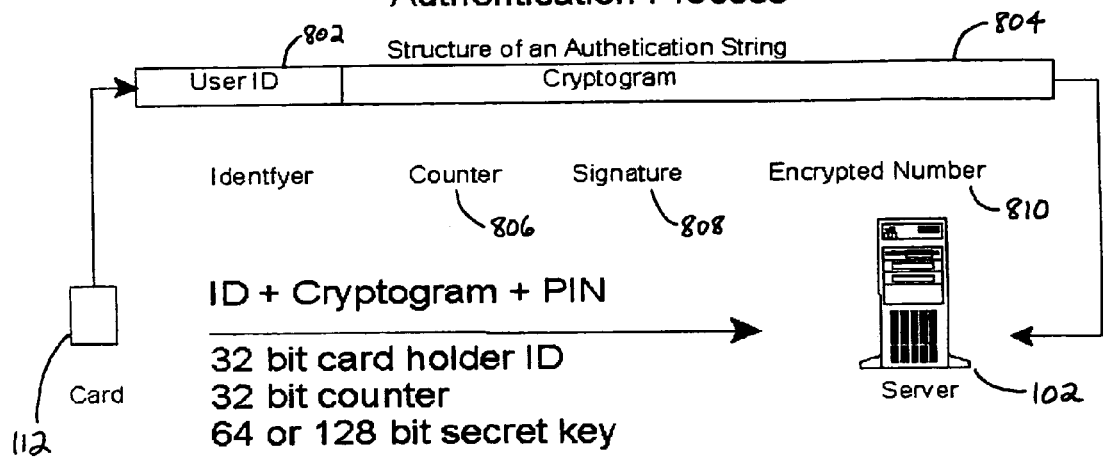

As illustrated in FIG. 8, the structure of an authentication string includes an ID field 802 and a cryptogram field 804. The ID field 802 identifies the specific record in the system database memory 222. Each of these records 230, 232, 234, is associated with a specific authorized user of the system 100. The cryptogram field 804 includes a counter 806, a signature key 808, and an encrypted number 810. The ID 802 plus the cryptogram 804 plus optionally a user entered personal identification number or Pin 812 are normally delivered from the user and the universal card 112 to the secure access central system 102.

Figure 7:
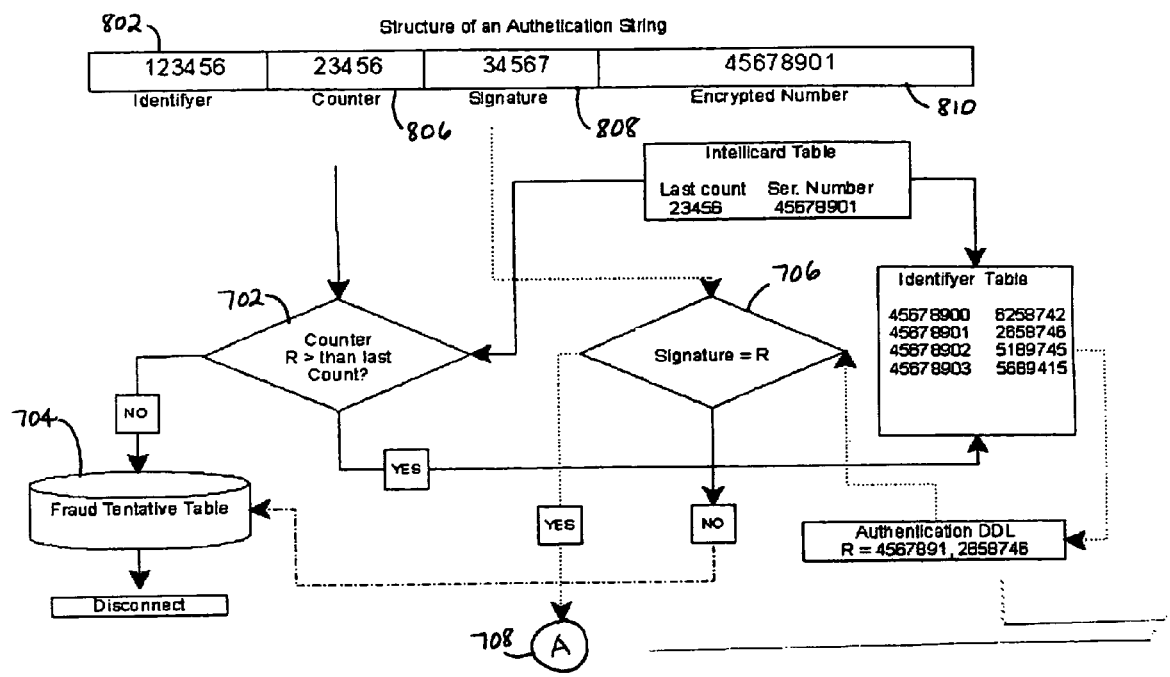
FIGS. 7 and 8 are operational flow diagrams illustrating exemplary authentication operational sequences for the exemplary system of FIG. 1.

As illustrated in FIG. 7, the authentication string includes the identifier 802, the counter 806, the signature 808, and the encrypted number 810, as discussed above. At step 406 as shown in FIG. 4, the universal card 112 transmits the authentication string to the secure access central system 102. The I/O controller 204 utilizes the tone signal processor 216 to decode the tone sequence constituting the authentication string and delivers digital data stream representing the authentication string to the central system controller 202. The central system controller 202 passes the data string to the database server 220 to authenticate the universal card 112. The database server 220 performs a lookup into the database memory 222 utilizing the identifier 802 to locate the record associated with an authorized user. The database server 220 then provides the record information to the central system controller 202 which then stores this information in memory 214 to process the secure access authorization sequence as will be discussed below.

At step 406 as shown in FIG. 4, the tone signal processor 216 attempts to decode and convert the authentication string into a digital bit stream of information. If it is not successful, then the secure access central system 102 determines that there is an error reading the universal card 112, at step 408. The secure access central system 102 then sends a prompt message to the user, at step 410, indicating that there has been an error in reading the card information and then, at step 412, the secure access central system 102 terminates the communication sequence.

If the authentication string is decoded and converted to a binary digital data string, at step 406, then the secure access central system 102 proceeds to decrypt the cryptogram portion of the authentication string, at step 414. The decryption is handled in accordance with the algorithm identified by the algorithm ID 246 in the user record for the universal card 112. The central system controller selects the particular algorithm information from the algorithm memory 250. If there is an error encountered during the decryption of the cryptogram of the authentication string, then, at step 416, the secure access central system 102 terminates the transaction. The secure access central system 102 may inform the user via a prompt message that there has been an unauthorized access of information and that the communication is being terminated. Alternatively, at step 414, if the secure access central system 102 is able to decrypt the cryptogram, then the secure access central system 102 further continues to process the contents of the cryptogram in accordance with the operational sequence illustrated in FIG. 7 and as discussed below.

The counter field 806 of the cryptogram is compared to the counter field 244 of the database record from the database memory 222. For each communication sequence utilizing the universal card 112, the counter information is incremented at the universal card 112 before transmitting to the secure access central system 102. Therefore, if the received counter information 806, at step 702, is not greater than the count information from the user record field 244, then at step 704, the central system controller 202 stores a fraud record in a fraud table to indicate the attempt to gain unauthorized access to the secure access central system 102. Additionally, the secure access central system 102 would terminate the transaction at step 416.

Once the count is confirmed, at step 702, then the signature key is verified, at step 706. The signature key 808 from the authentication string is compared to the key 242 from the database record located in the database memory 222. If the signatures do not match, at step 706, then the central system controller 202 updates the fraud table at step 704 and the transaction ends at step 416. However, if the signatures do match, at step 706, then the secure access central system 102 proceeds to prompt the user to enter a personal identification number, at step 418 (see FIG. 5). At this point in the sequence, the universal card 112 has been authenticated and now the user of the universal card 112 is being authenticated by entering a personal identification number or PIN at step 420.

The PIN could be entered by the user in a normal fashion by pressing buttons on the telephone. Alternatively, the user could be required to enter a certain user input or voice input into the universal card 112 that then forwards a PIN to the secure access central system 102 in response to the user input or the voice input at the universal card 112. The transmitted PIN information into the telephone receiver would normally comprise a different value or different information than the user's actual input into the universal card 112. By utilizing the universal card 112 to translate the user input and/or the voice input to a PIN that is then transmitted into the telephone receiver, the present invention further defeats any potential unauthorized use of the system 100 by not revealing the actual PIN code to any casual observer in the vicinity. A number of exemplary alternative means of inputting information into the universal card 112 will be discussed in detail below.

The PIN code is received by the secure access central system 102 and then it is compared to a PIN information stored in the particular record for the authorized user. If the PIN code received matches the PIN stored in the database record for the authorized user, at step 422, then both the universal card 112 and the user of the card 112 have been authenticated and are authorized to proceed to access secured access functions of the secure application/function server 103. However, if the received PIN code does not match the PIN information stored in the database record for the particular authorized user, at step 422, then the secure access central system 102 sends a prompt message to the user, at step 424. The message may indicate to the user that they have entered incorrectly the PIN code and then the secure access central system 102 increments a counter 806, at step 426, and allows the user to enter the PIN code once again. If the user fails to enter a PIN code that matches the stored PIN information stored in the user record in the database for more than three times, at step 428, then the secure access central system 102 proceeds to update a fraud database at step 430, and then terminates the transaction at step 432.

In this exemplary communication sequence, the authorized user is engaging in a financial transaction with an electronic purse and a financial institution. As illustrated in FIG. 6, the authorized user may proceed to communicate with the secure application/function server 103 to complete a financial transaction. A financial transaction database record related to the particular authorized user is made available to the user, at step 434. The secure application/function server 103 then may prompt the user for specific information necessary to conduct the transaction. If the authorized user record identifies a particular language that the user desires for the transaction, then that particular language will be used to conduct a transaction at steps 446, 448. If that information is not available in the database, then the secure application/function server 103 would prompt the user to select a desired language at steps 438, 440, 470, and then proceed to conduct the transaction for the user. Other transaction information such as bank account information or credit card information may be likewise verified from the database record for the authorized user and if not available from the record, then the secure application/function server 103 would prompt the user for the particular information to complete the transaction. Once all the user specific information to conduct the transaction is available, then the secure application/function server 103 would operate to verify the financial condition of the users account with the financial institution, at step 454. If the user has available funds, at step 456, then the secure application/function server 103 would proceed 460 to complete a transaction for the authorized user. On the other hand, if the financial account at the financial institution is fully depleted, at step 458, then the server 103 may proceed to take alternative action, at step 462. For example, the server 103, may prompt a user to transfer funds from another account.

Figure 9:
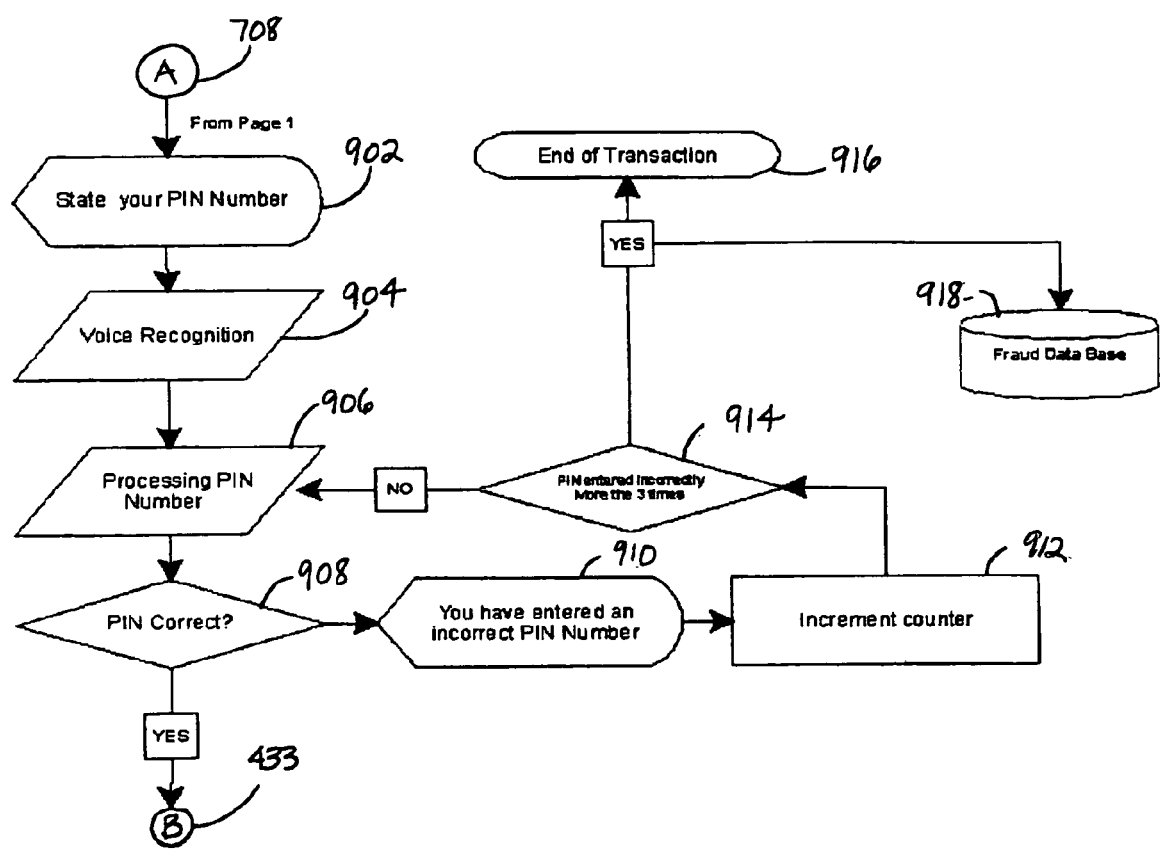
FIGS. 9, 10, 11, 12, and 13, are operational flow diagrams illustrating alternative operational sequences for the exemplary system shown in FIG. 1 according to alternative preferred embodiments of the present invention.

Referring to FIG. 9, an alternative operational sequence is illustrated for the system 100. In this example, a voice audio input and recognition feature of the system 100 allows a user of the universal card 112 to speak a PIN information into the card 112, at step 902. Voice recognition is performed in the card 112, at step 904, to determine whether the user is an authorized user of the card by providing a valid PIN information. The determination of whether the user is authorized to use functions of the secure application/function server 103 is performed in the card 112, at steps 906, 908, 910, 912, and 914. When the PIN is entered incorrectly for three times the universal card then updates an internal fraud database and then terminates the transaction, at steps 918 and 916. Additionally, at step 918, the card 112 may transmit an unauthorized user code to the secure access central 102 to indicate an attempt to access secured functions of the system 100 by an unauthorized user.

Figure 10:
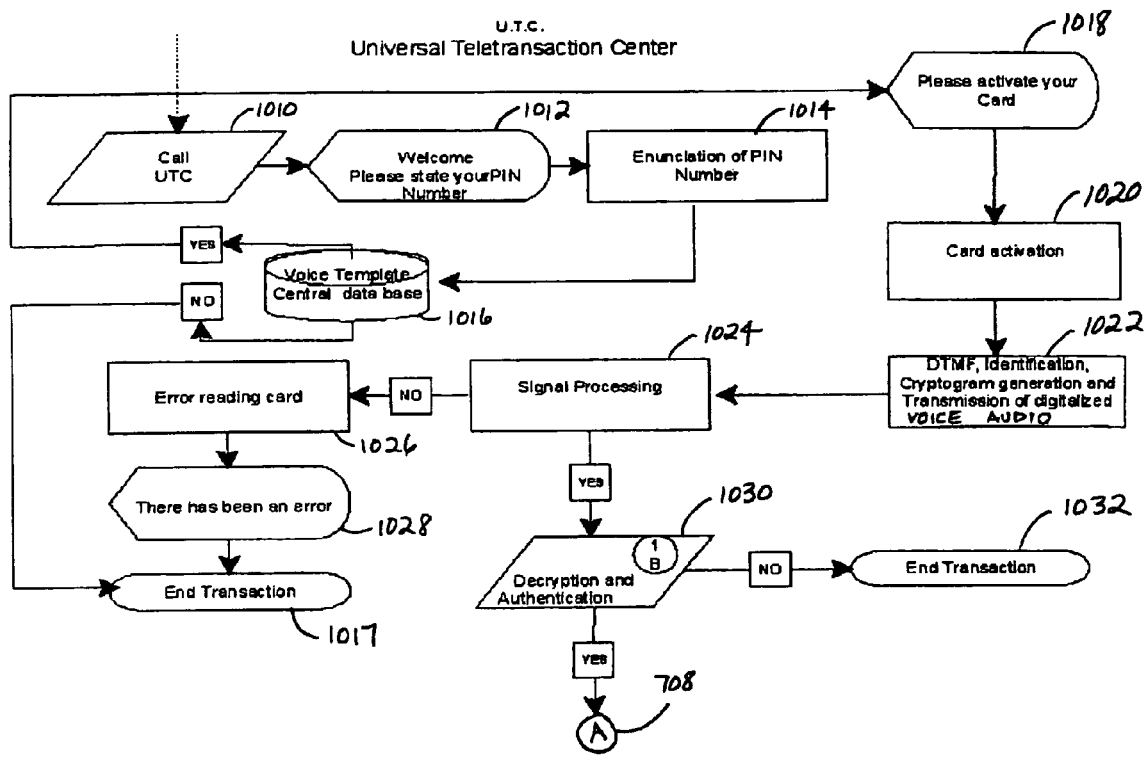

Referring to FIG. 10, in another exemplary alternative embodiment of the present invention, the user enters voice audio input via the card 112 that then digitizes and forwards digitized voice audio information to the secure access central 102 for processing, at steps 1010, 1012, 1014, 1016, 1018, 1020, and 1022. A main advantage illustrated by this example is that the more CPU intensive and memory intensive operations are handled at the central 102 rather than at the card 112 that normally is more constrained with limited resources, such as depleting power source, limited CPU power, and limited memory.

At step 1016, the card 112 handshakes with the central 102 to confirm that a central digitized voice audio database is available for authorizing the particular card 112. The secure access central 102 then receives the cryptogram transmission from the card 112 and then processes it, at steps 1022, 1024, 1026, 1028 and 1030. At step 1030, the central 102 further processes the digitized voice audio and compares the user's digitized voice audio information to at least one template at a central database to determine whether there is a match. A match then authorizes the card 112 and the user's voice audio PIN information entry. Thereafter, in this example, the user can enter a separate PIN information, such as via the keypad, at step 418 (see FIG. 5), and the processing then continues as discussed above with reference to FIG. 5.

Figure 11:
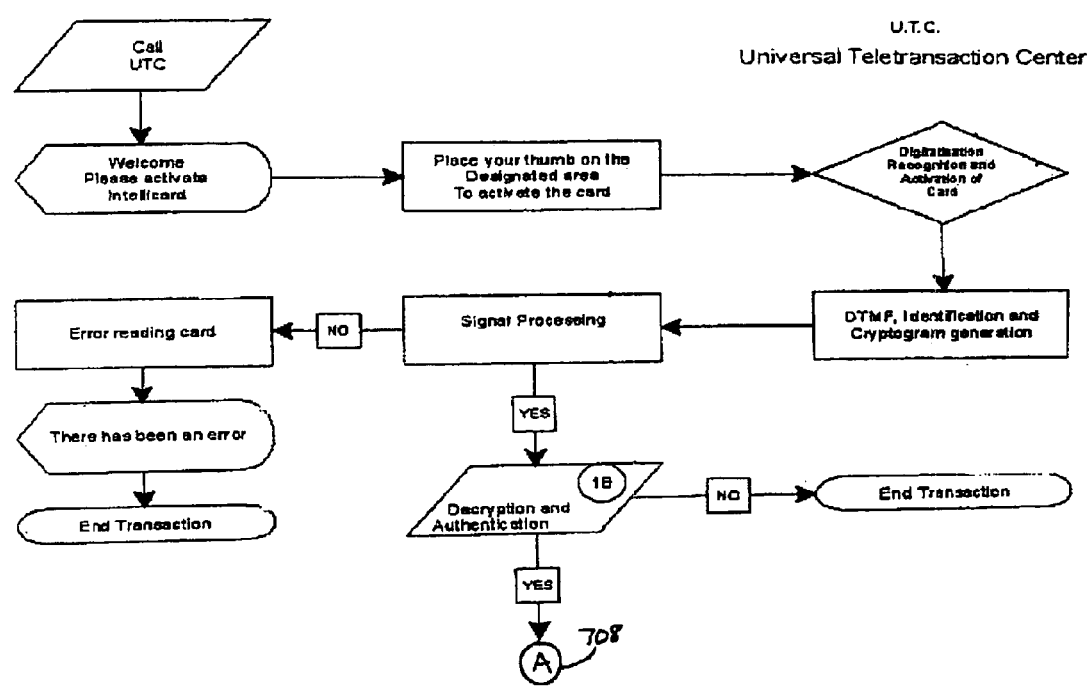

Referring to FIG. 11, in another exemplary operational sequence, the card 112 captures biometric data from the user, such as the user's thumb finger print. The card 112, in this example, captures the digitized thumb print information and compares it locally to at least one template to determine whether the user is authorized to access functions of the card 112. The card 112, after determining that the user is an authorized user, then proceeds to create the secure message and then transmits this information to the central 102. The central 102 then processes it to determine the authorized card 112 and authorized user to access secured access functions at the secure application/function server 103.

Figure 12:
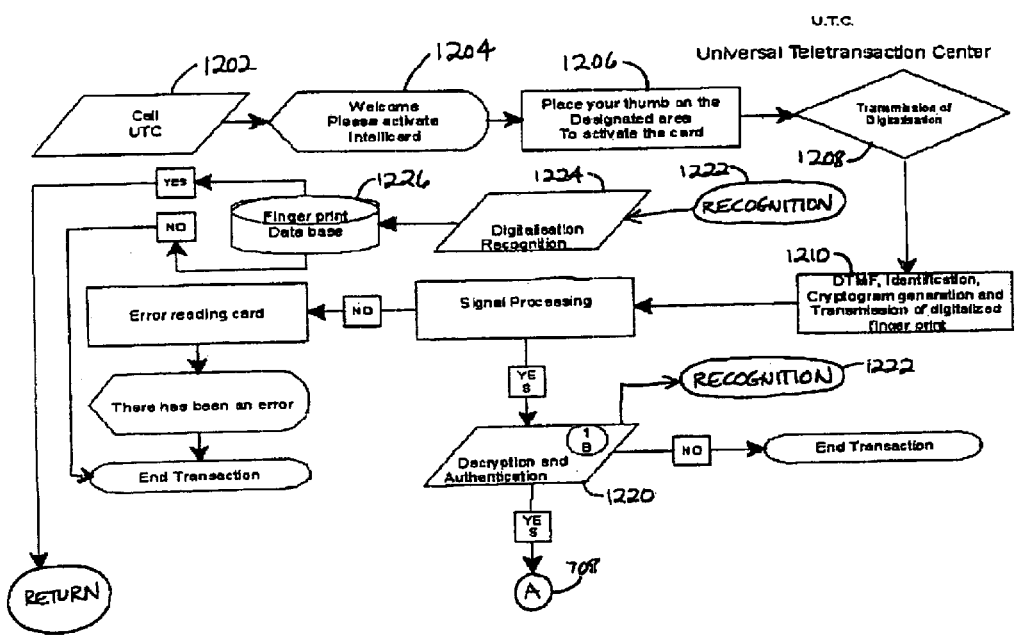

Referring to FIG. 12, in another exemplary operational sequence, the card 112 facilitates the central 102 processing user biometric information such as a finger print to authenticate the card 112 and user. The card 112, in this example, captures the digitized thumb print information and then transmits this information to the central 102, at steps 1202, 1204, 1206, 1208, and 1210. The central 102, at steps 121, 1220, 1222, 1224, and 1226, then processes the message, including the digitized thumb print information, to determine the authorized card 112 and authorized user to permit access to secured access functions at the secure application/function server 103. A main advantage illustrated by this example is that the more CPU intensive and memory intensive operations are handled at the central 102 rather than at the card 112 that normally is more constrained with limited resources, such as depleting power source, limited CPU power, and limited memory.

Figure 13:
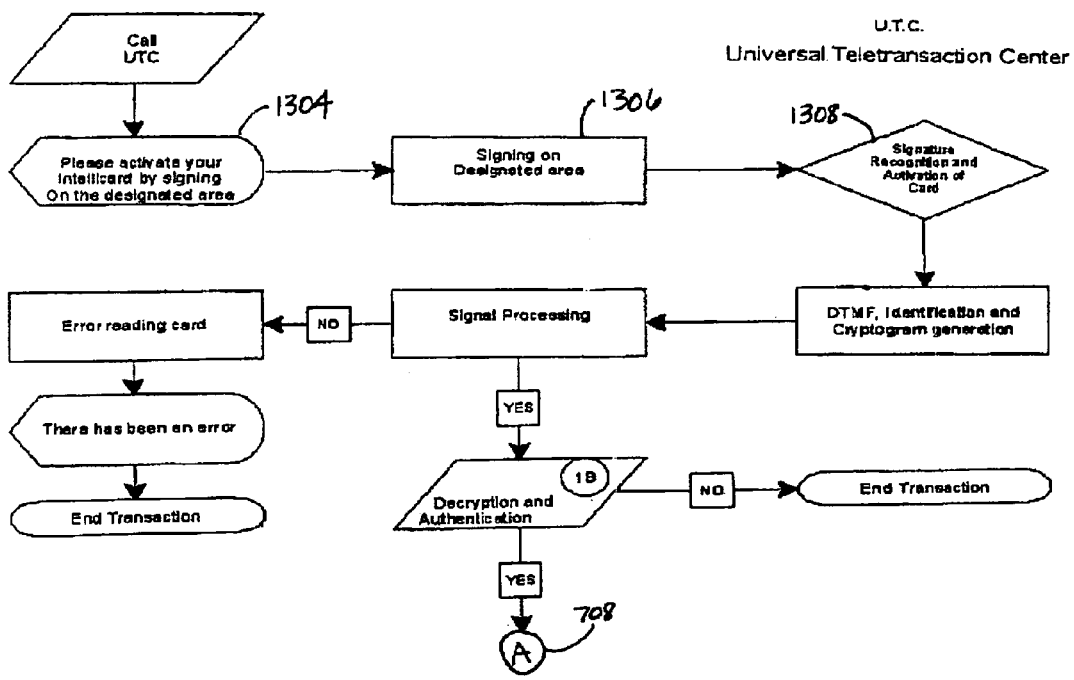
Figure 1:
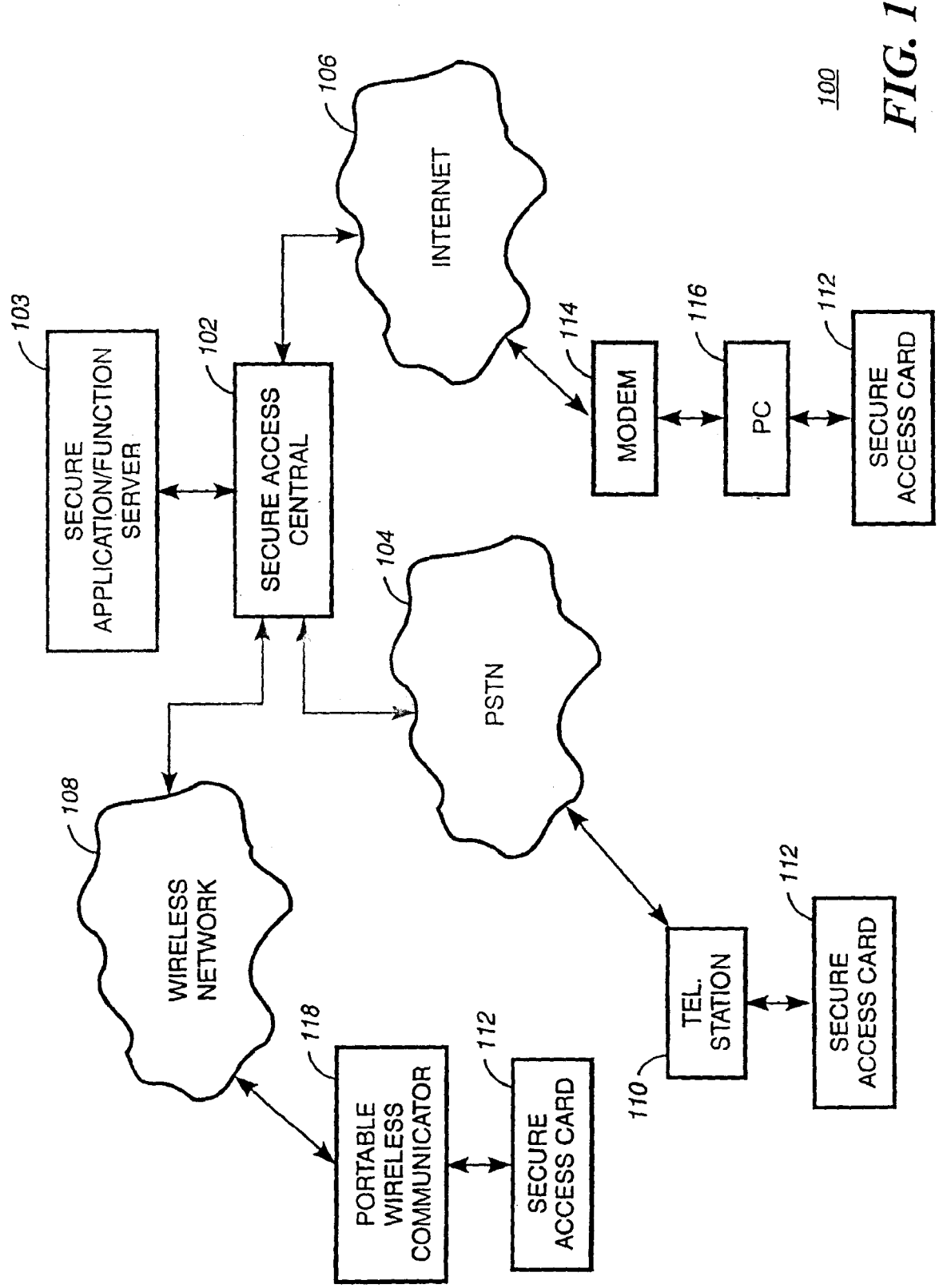
Figure 2:
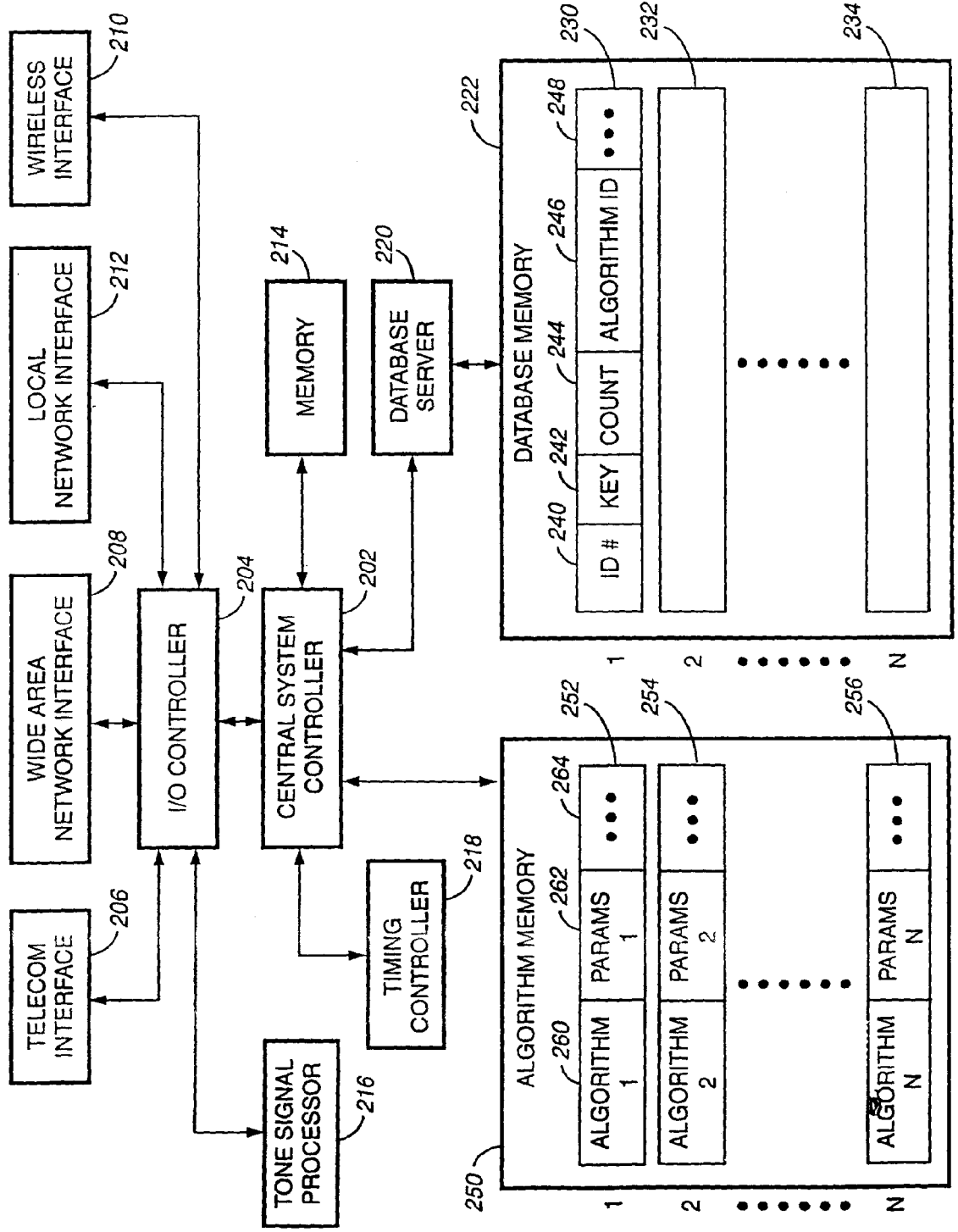
Figure 3:
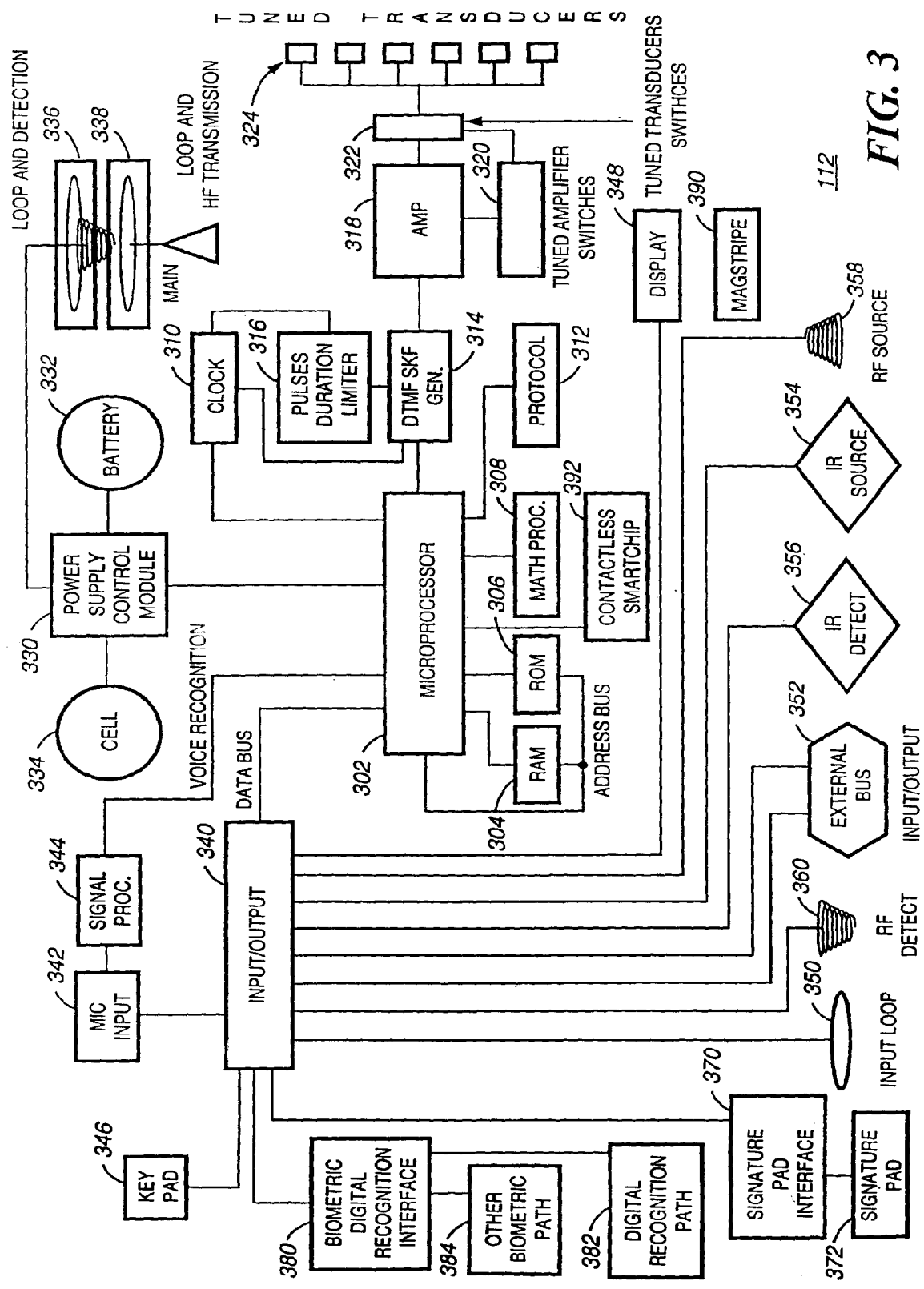
Figure 4:
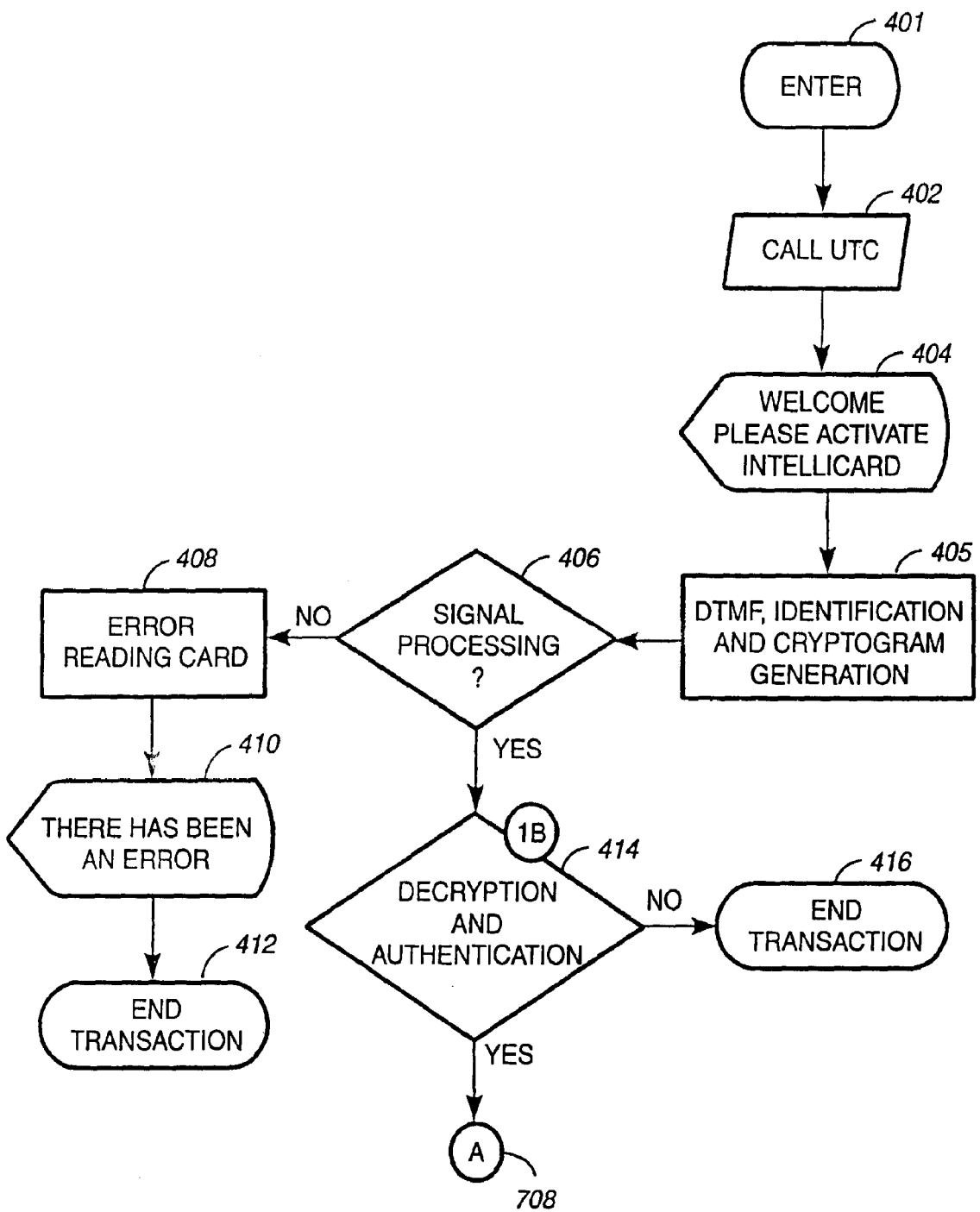
Figure 5:
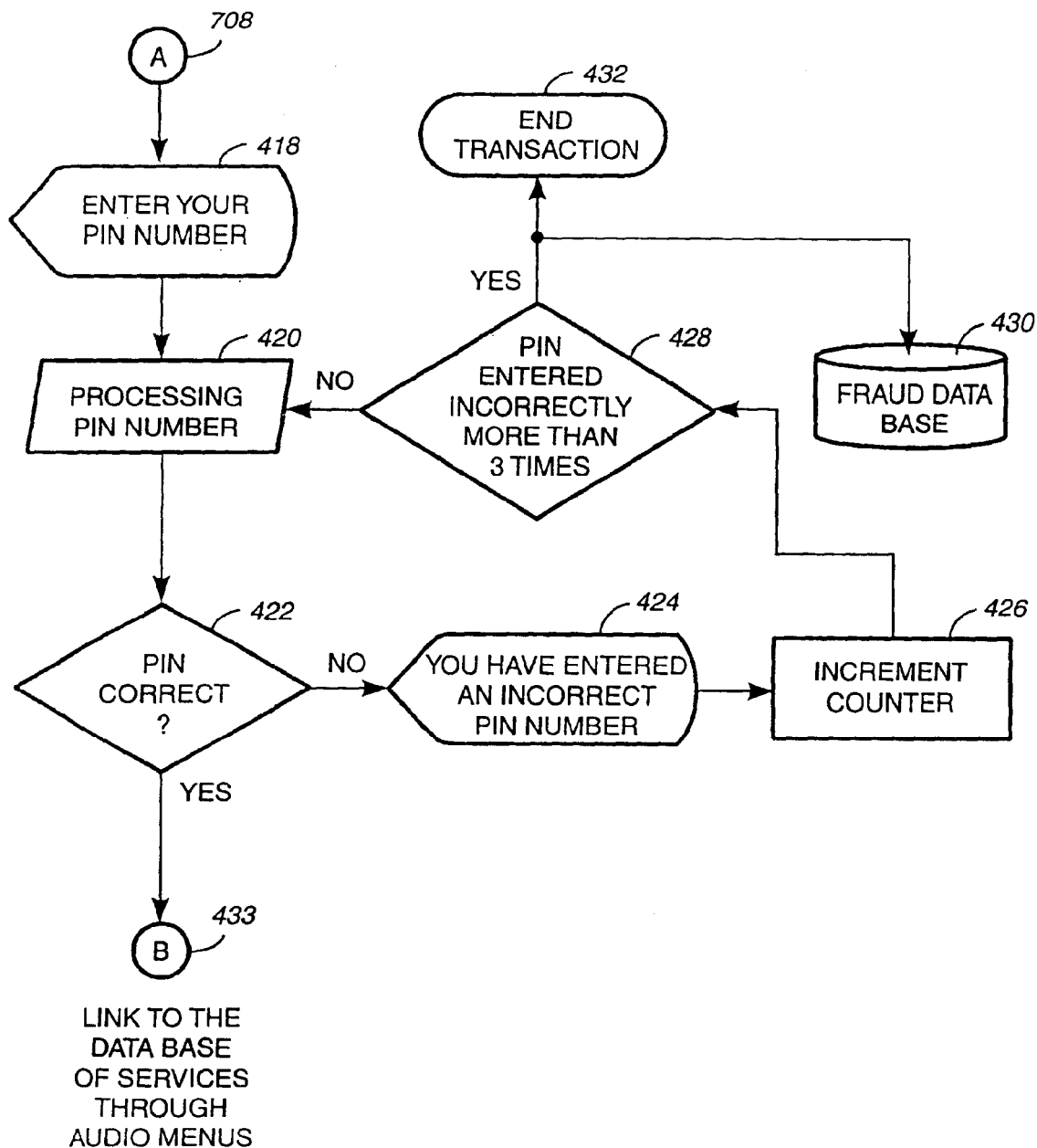
Figure 6:
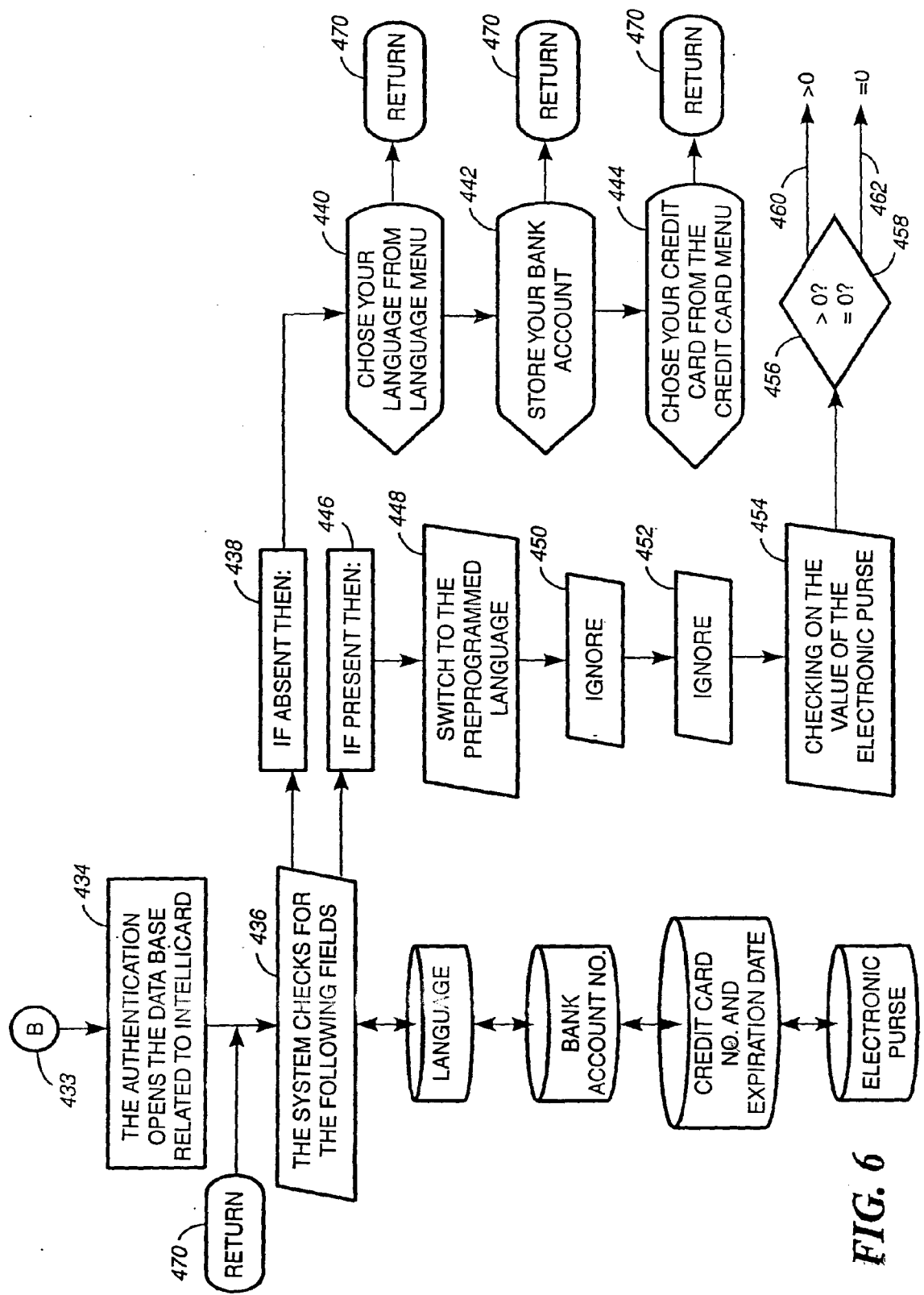
Figure 9:
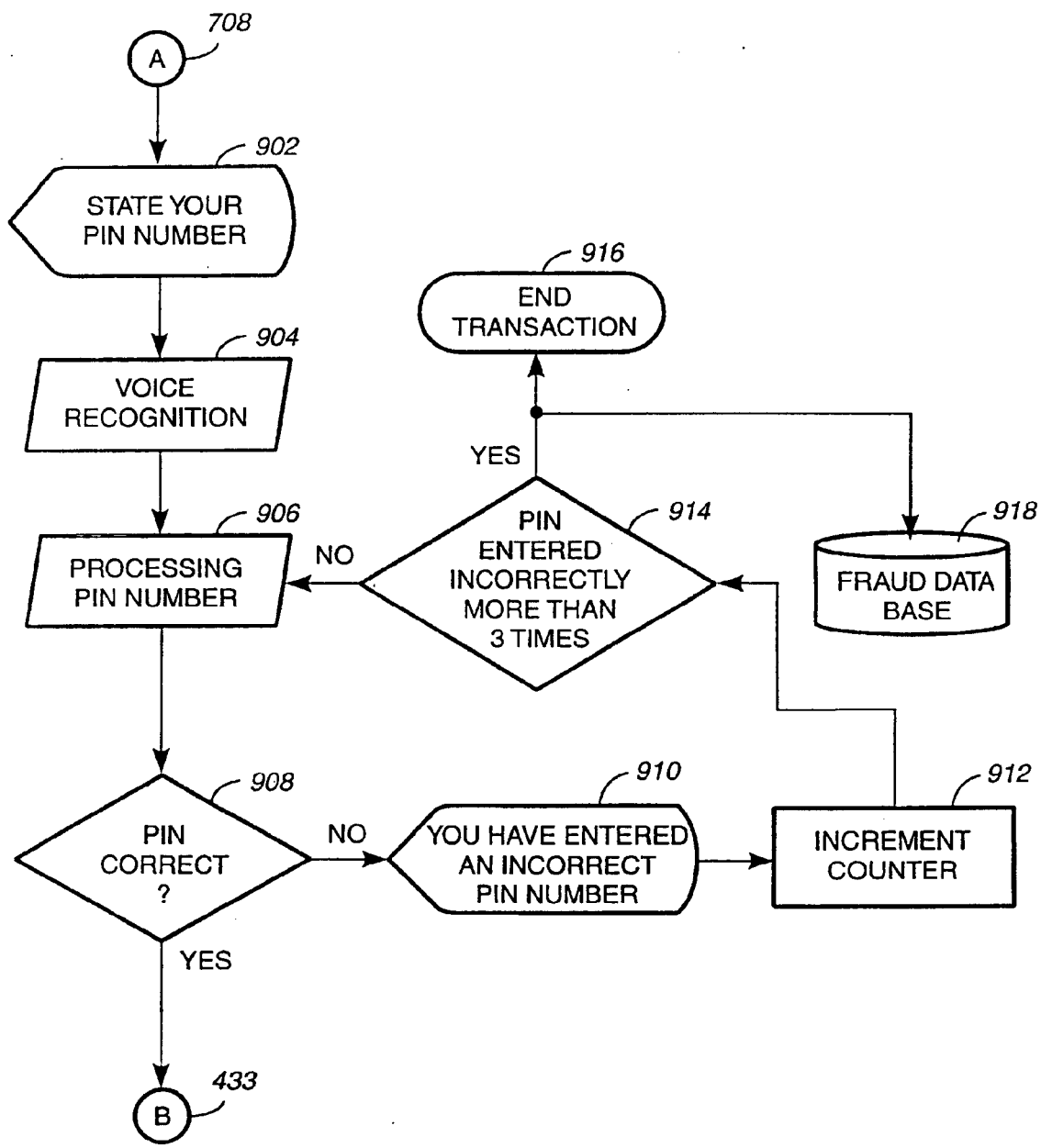
Figure 10:
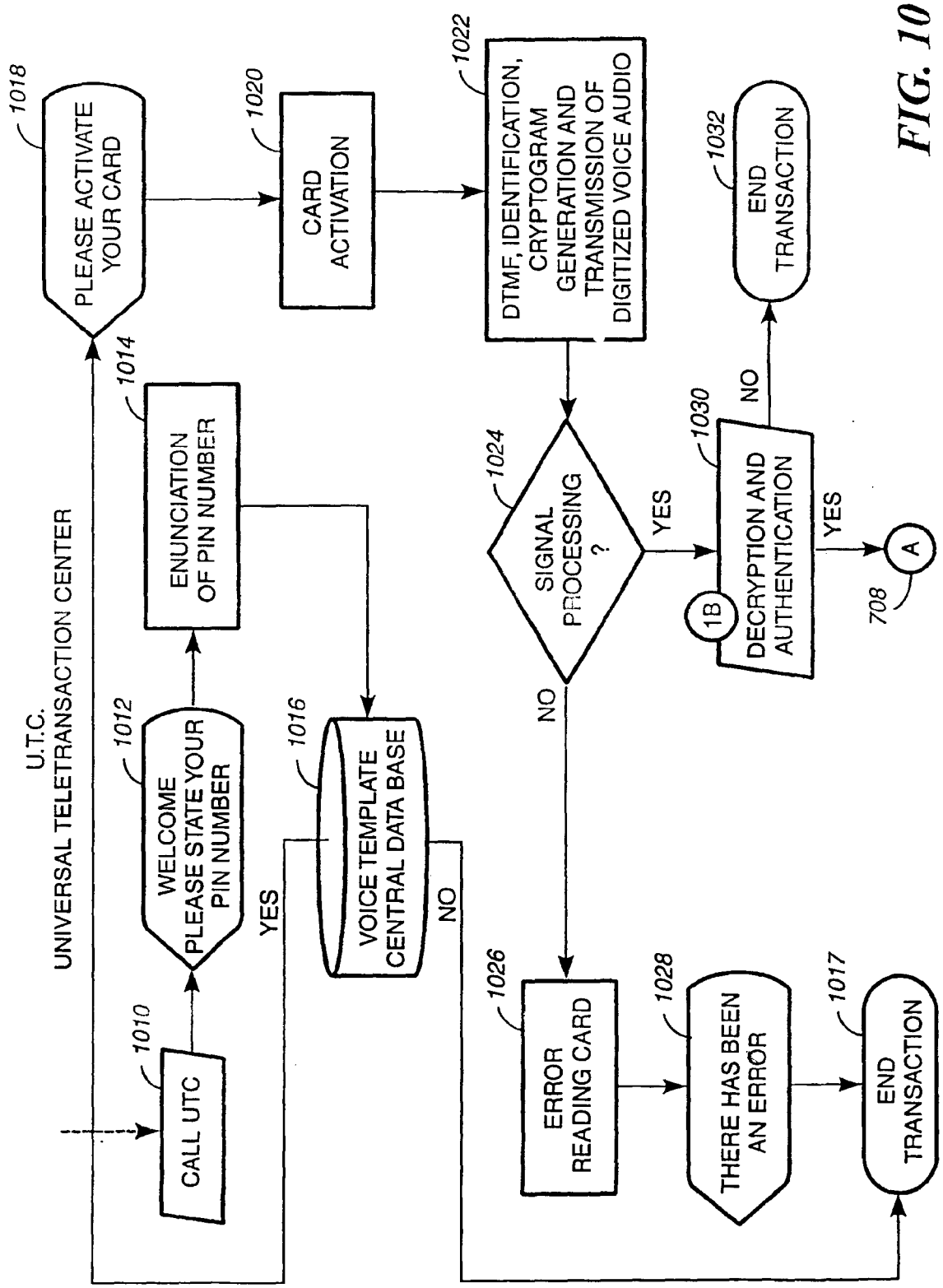
Figure 11:
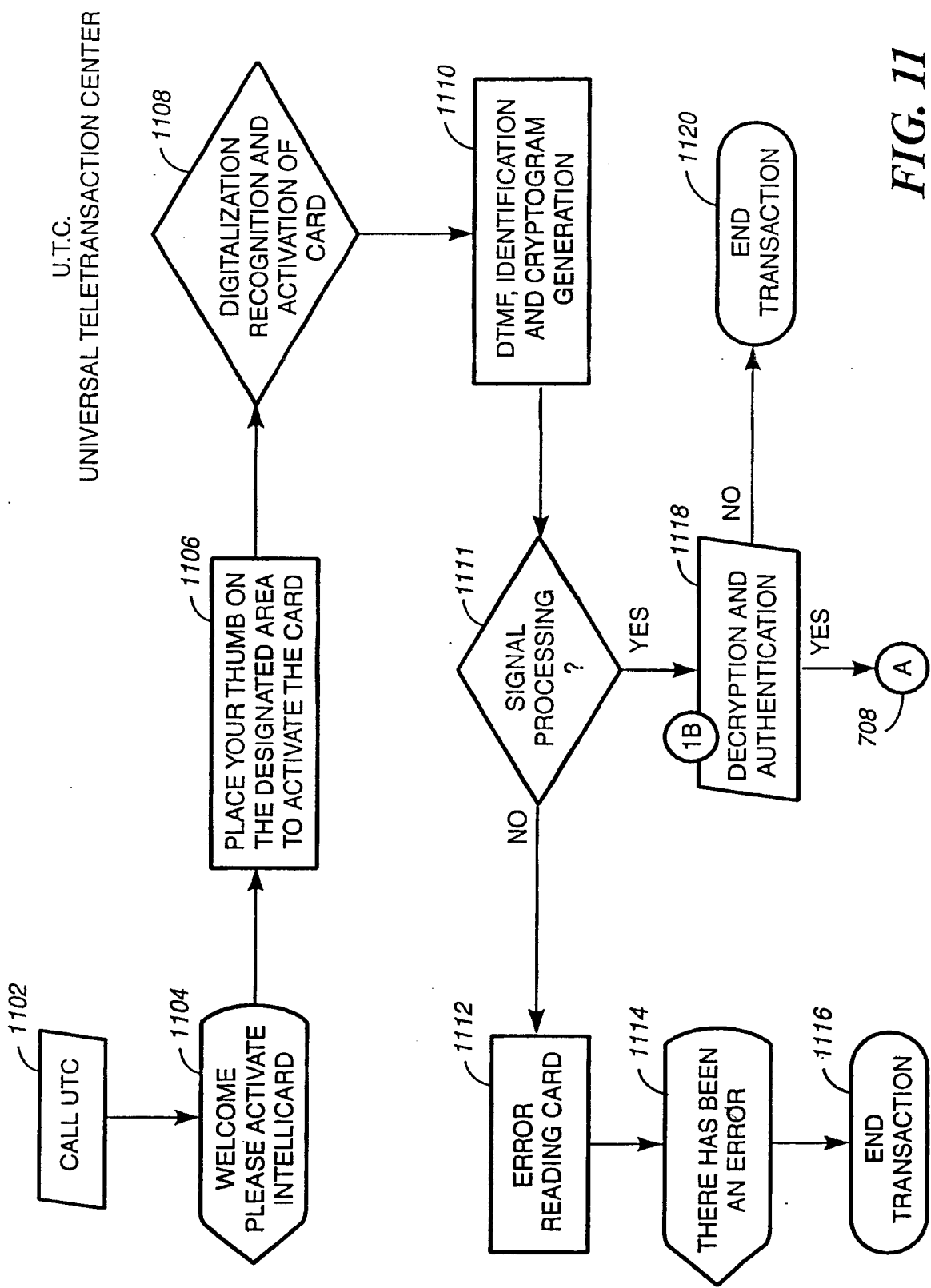
Figure 12:
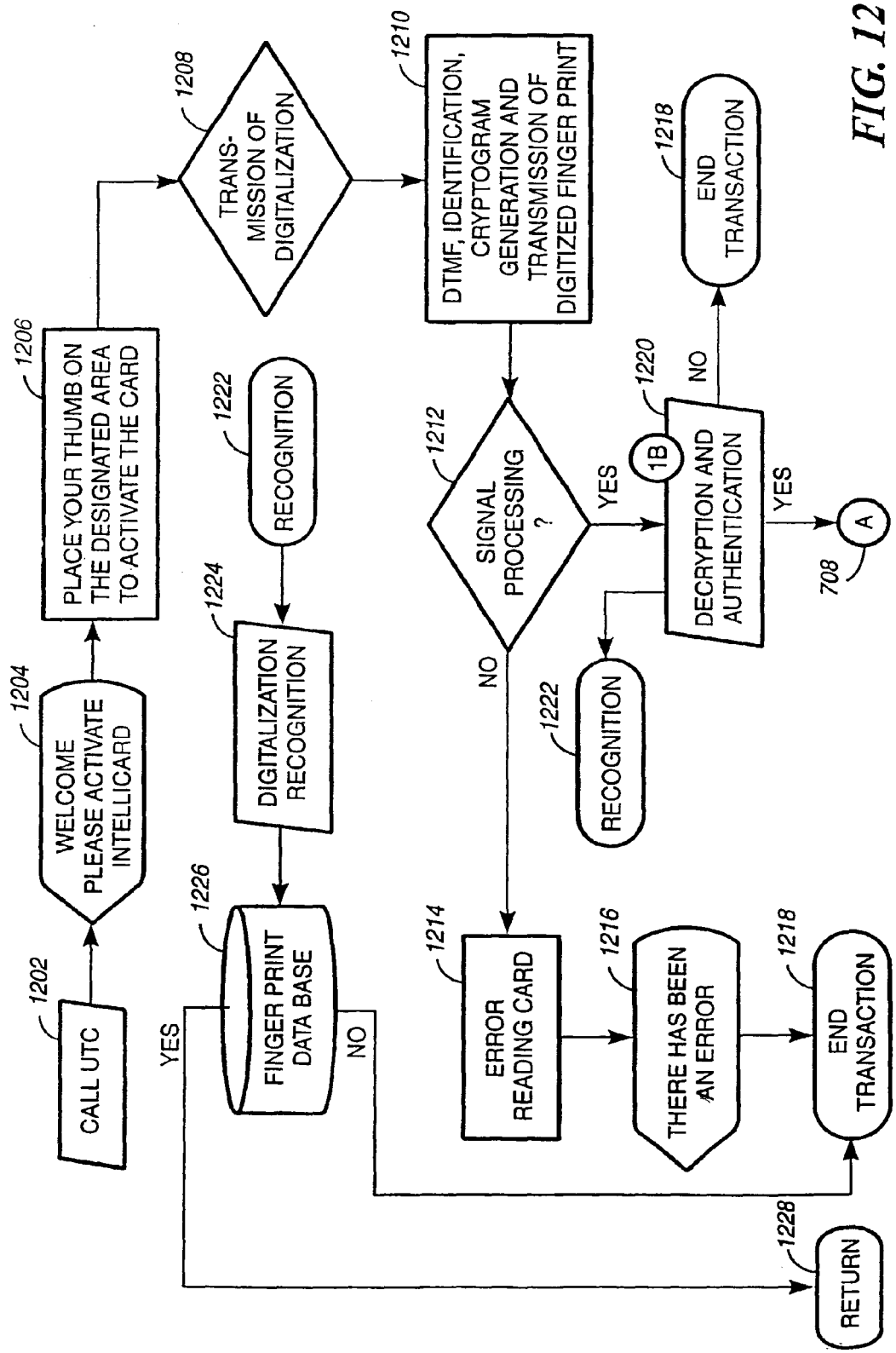
Figure 13:
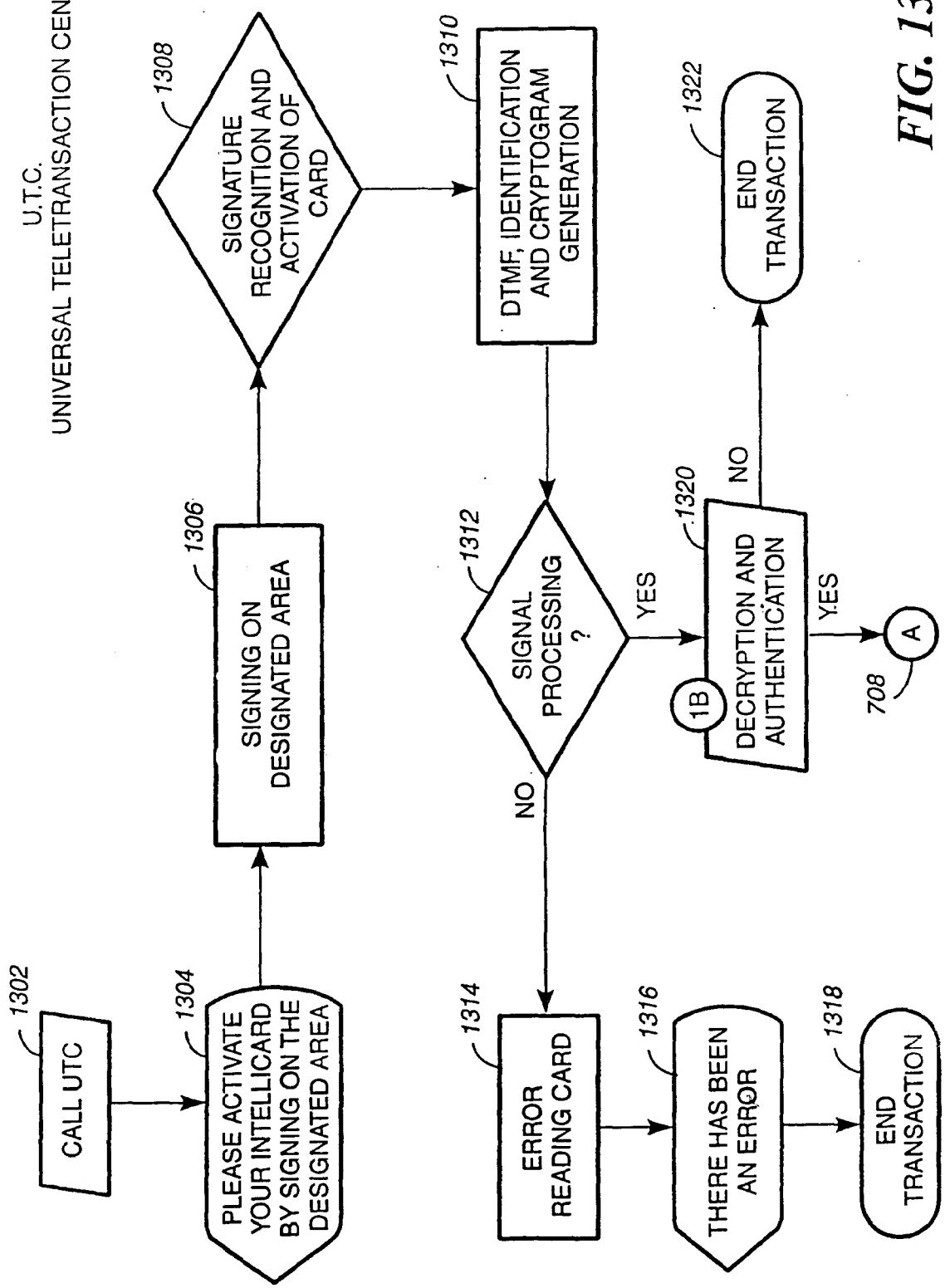

Referring to FIG. 13, in a further exemplary operational sequence, the card 112 captures a signature input from a user, at steps 1304, 1306, and 1308. In one mode, the card 112 compares the digitized signature information to at least one signature template to determine whether the user is an authorized user. After the card 112 determines the user is authorized to access functions of the card 112, then the card 112 transmits a secure authentication message to the central 102 for processing therein, as discussed above.

In a second mode (not shown in FIG. 13), the card 112 captures a signature input from a user and then transmits the captured signature input from the user to the central 102. The central 102 then compares the digitized signature information from the user to at least one signature template in a database at the central 102 to determine whether the user is an authorized user. This second mode illustrates the advantageous use of the central 102 resources, e.g., larger memory capacity and more powerful CPU, to handle the more CPU intensive and memory intensive functions 102 rather than at the card 112 that normally is more constrained with limited resources, such as depleting power source, limited CPU power, and limited memory.

As has been discussed above, the universal card 112 significantly facilitates an authorized user's secure access to secured access functions of a system 100. At the same time, however, it provides a significant deterrent to unauthorized use of the system 100. First, the password protection on the card makes it difficult for unauthorized users that have misappropriated a universal card 112 to access the secured functions therein. Further, at a communication station, such as a telephone station 110 or a personal computing station 116 or a portable wireless communicator 118, the authorized user can communicate with the secure access central system 102 to conduct an authorization sequence while defeating spotters and criminals from gaining access to private information. Alternative means of capturing user input have been discussed, such as keypad input, voice audio input, fingerprint input, and signature input. Additionally, the universal card 112, utilizing its novel tone output feature, can deliver audio information to the secure access central system 102 via less than optimal conditions at the particular input station, such as at the telephone station 110, a personal computer station 116, and a portable wireless communicator 118. Where there is significant ambient noise and the audio coupling between the universal card 112 and the telephone station 110, for example, the universal card 112 is still able to reliably deliver the tone sequence audio necessary to conduct the secure access authorization sequence.

Although specific embodiments of the invention have been disclosed, it will be understood by those having skill in the art that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A secure access card comprising:
at least one tone generator for generating tone audio output external from one side of the secure access card, the tone audio output comprising at least one tone signal that is variable in at least one of tone frequency, time duration of tone, time duration of space between tones, and by amplitude of tone, and wherein the at least one tone generator comprises a plurality of acoustic transducers that are mechanically tuned to oscillate about their mechanical resonant frequency to substantially maximize audio power output from each of the plurality of acoustic transducers being oriented outward of the one side of the secure access card for generating, from each of the plurality of acoustic transducers, the tone audio output external to the one side of the secure access card;
input means for accepting input from a user; and
a controller, electrically coupled to the at least one tone generator and the input means, for controlling the at least one tone generator to generate a tone sequence corresponding to the input from the user, the tone sequence for delivery via a communication network interface, the secure access card being of size and form for convenient carrying and use by a user.

2. The secure access card according to claim 1, wherein the at least one tone generator generates a tone sequence comprising at least one of dual tone multi-frequency (DTMF) signals, FSK signals, MSK signals, and multitone signals, to identify the user as an authorized user.

3. The secure access card according to claim 1, wherein the at least one tone generator further comprises a controllable amplifier circuit, the controller being electrically coupled to the controllable amplifier circuit and to the plurality of acoustic transducers to selectively control the controllable amplifier circuit and the plurality of acoustic transducers to generate the tone sequence corresponding to the input from the user.

4. The secure access card according to claim 1, wherein each of the plurality of acoustic transducers being oriented outward of the one side of the secure access card and further being located at the one side of the secure access card for audio coupling the tone audio output from each of the plurality of acoustic transducers directed outward and external to the one side of the secure access card and to a telephone audio receiver for delivering a tone sequence via a communication network interface comprising a telephone network interface for a publicly switched telephone network (PSTN).

5. The secure access card according to claim 1, further comprising a memory for storing identification information, and wherein the controller is electrically coupled to the memory and to the input means for monitoring the input means for user input and to determine whether the user input matches the stored identification information to permit the card to generate the tone sequence for delivery via the communication network interface.

6. The secure access card according to claim 5, wherein the input means comprises at least one of a key input, a voice audio input, a signature input, and a fingerprint input, to capture user input from a user of the secure access card, the user input being compared to the stored identification information to permit the card to generate the tone sequence for delivery via the communication network interface.

7. The secure access card according to claim 1, further comprising a memory for storing a representation of user input, and wherein the controller is electrically coupled to the memory and to the input means for monitoring the input means for user input and to store a representation of the user input in the memory, the controller controlling the at least one tone generator to generate a tone sequence corresponding to the stored representation of the user input, the tone sequence for delivery via a communication network interface to a secure access server to determine whether the user input identifies the user as an authorized user of secure access function of a system.

8. The secure access card according to claim 7, wherein the input means comprises at least one of a key input, a voice audio input, a signature input, and a fingerprint input, to capture user input from a user of the secure access card and to store a representation of the user input in the memory, the controller controlling the at least one tone generator to generate a tone sequence corresponding to the stored representation of the user input for delivery via a communication network interface to a secure access server to determine whether the user input identifies the user as an authorized user of secure access function of a system.

9. The secure access card according to claim 7, wherein the tone sequence comprises a representation of the captured at least one of a key input, a voice audio input, a signature input, and a fingerprint input from a user of the secure access card to identify the user thereof.

10. A communication system comprising:
   a communication network;
   a secure application/function server, electrically coupled to the communication network, for providing secured access functions to an authorized user across the communication network;
   a secure access server, electrically coupled to the communication network, for determining whether a user across the communication network is an authorized user, the secure access server including:
      a network interface for coupling communication signaling between the communication network and the secure access server;
      a tone signal processor electrically coupled to the network interface for receiving and processing communication signaling from the communication network, the communication signaling comprising at least one tone signal in a tone sequence;
      a database memory for storing authorized user identification information including for each authorized user at least one of a personal identification number (PIN), a voice identification information, a fingerprint identification information, and a signature identification information; and
      a controller, electrically coupled to the tone signal processor and the database memory, for receiving communication signaling from the communication network, the communication signaling comprising at least one tone signal in a tone sequence representative of user identification information, and for comparing the user identification information to the stored authorized user identification information to determine whether the user identification information received from across the communication network corresponds to an authorized user for accessing secured access functions provided by the secure application/function server to an authorized user across the communication network; and
   a secure access card, being of size and form for convenient carrying and use by a user, including:
      at least one tone generator for generating tone audio output external from one side of the secure access card, the tone audio output comprising at least one tone signal that is variable in at least one of tone frequency, time duration of tone, time duration of space between tones, and by amplitude of tone, and wherein the at least one tone generator comprises a plurality of acoustic transducers that are mechanically tuned to oscillate about their mechanical resonant frequency to substantially maximize audio power output from each of the plurality of acoustic transducers being oriented outward of the one side of the secure access card for generating, from each of the plurality of acoustic transducers, the tone audio output external to the one side of the secure access card;
      input means for accepting input from a user; and
      a controller, electrically coupled to the at least one tone generator and the input means, for controlling the at least one tone generator to generate a tone sequence corresponding to the input from the user and providing user identification information, the tone sequence for delivery via the communication network to the secure access server to identify the user as an authorized user for accessing secured access functions provided by the secure application/function server to the authorized user across the communication network.

11. The communication system according to claim 10, wherein the at least one tone generator generates a tone sequence comprising dual tone multi-frequency (DTMF) signals to identify the user as an authorized user.

12. The communication system according to claim 10, wherein the at least one tone generator further comprises a controllable amplifier circuit, the controller being electrically coupled to the controllable amplifier circuit and to the plurality of acoustic transducers to selectively control the controllable amplifier circuit and the plurality of acoustic transducers to generate the tone sequence corresponding to the input from the user.

13. The communication system according to claim 10, wherein each of the plurality of acoustic transducers being oriented outward of the one side of the secure access card and further being located at the one side of the secure access card for audio coupling the tone audio output from each of the plurality of acoustic transducers directed outward and external to the one side of the secure access card and to a telephone audio receiver for delivering a tone sequence via the communication network comprising a publicly switched telephone network (PSTN).

14. The communication system according to claim 10, further comprising a memory for storing identification information, and wherein the controller is electrically coupled to the memory and to the input means for monitoring the input means for user input and to determine whether the user input matches the stored identification information to permit the card to generate the tone sequence for delivery via the communication network interface.

15. The communication system according to claim 14, wherein the input means comprises at least one of a key input, a voice audio input, a signature input, and a fingerprint input, to capture user input from a user of the secure access card, the user input being compared to the stored identification information to permit the card to generate the tone sequence for delivery via the communication network interface.

16. The communication system according to claim 10, further comprising a memory for storing a representation of user input, and wherein the controller is electrically coupled to the memory and to the input means for monitoring the input means for user input and to store a representation of the user input in the memory, the controller controlling the at least one tone generator to generate a tone sequence corresponding to the stored representation of the user input, the tone sequence for delivery via the communication network to the secure access server to determine whether the user input identifies the user as an authorized user of secure access function of a system.

17. The communication system according to claim 16, wherein the input means comprises at least one of a key input, a voice audio input, a signature input, and a fingerprint input, to capture user input from a user of the secure access card and to store a representation of the user input in the memory, the controller controlling the at least one tone generator to generate a tone sequence corresponding to the stored representation of the user input for delivery via the communication network to the secure access server to determine whether the user input identifies the user as an authorized user.

18. A method for a communication system comprising the steps of:

capturing user input at a secure access device, the secure access device being of size and form for convenient carrying and use by a user;

storing a representation of the user input at the secure access device;

acoustically transmitting by at least one tone generator in the secure access device tone audio output external from one side of the secure access device, the tone audio output comprising a tone sequence, including a first tone and a second tone different from the first tone, destined for reception across a communication network, the tone sequence corresponding to the stored representation of the user input, wherein the at least one tone generator comprises a plurality of acoustic transducers that are mechanically tuned to oscillate about their mechanical resonant frequency to substantially maximize audio power output from each of the plurality of acoustic transducers being oriented outward of the one side of the secure access device for generating, from a first one of the plurality of acoustic transducers the first tone and from a second one of the plurality of acoustic transducers the second tone, the tone audio output external to the one side of the secure access device;

receiving from across the communication network a representation of the transmitted tone sequence;

comparing the received representation of the transmitted tone sequence to pre-stored authorized user identification information; and determining whether a match between the representation of the transmitted tone sequence and a pre-stored authorized user identification information identifies the user of the secure access device as an authorized user of the communication system.

19. The method of claim 18, wherein the step of capturing user input at a secure access device comprises the step of:

capturing at least one of a key input, a voice audio input, a signature input, and a fingerprint input, to capture user input from a user of the secure access device.

20. A secure access device comprising:

at least one tone generator for generating tone audio output external from one side of the secure access device, the tone audio output comprising a tone sequence including a first tone and a second tone different from the first tone, and wherein the at least one tone generator comprises a plurality of acoustic transducers being mechanically tuned to oscillate substantially at their mechanical resonant frequency to substantially maximize audio power output from each of the plurality of acoustic transducers being oriented outward of the one side of the secure access device for generating, from a first one of the plurality of acoustic transducers the first tone and from a second one of the plurality of acoustic transducers the second tone, the tone audio output external to the one side of the secure access device, and wherein the secure access device being in a credit card form factor for convenient carrying and use by a user;

input means for accepting input from a user; and a controller, electrically coupled to the at least one tone generator and the input means, for controlling the at least one tone generator to generate a tone sequence corresponding to the input from the user, the tone sequence for delivery via a communication network interface.

21. The secure access card according to claim 1, wherein the secure access card being in a credit card form factor for convenient carrying and use by a user.

* * * * *

UNITED STATES PATENT AND TRADEMARK OFFICE
CERTIFICATE OF CORRECTION

PATENT NO.         : 7,013,393 B1
APPLICATION NO. : 09/468621
DATED              : March 14, 2006
INVENTOR(S)        : Pierre Stevens It is certified that error appears in the above-identified patent and that said Letters Patent is hereby corrected as shown below:

Delete Figures 1-13 and substitute with the enclosed Figures 1-13

Signed and Sealed this

Twenty-fourth Day of October, 2006

JON W. DUDAS
*Director of the United States Patent and Trademark Office*

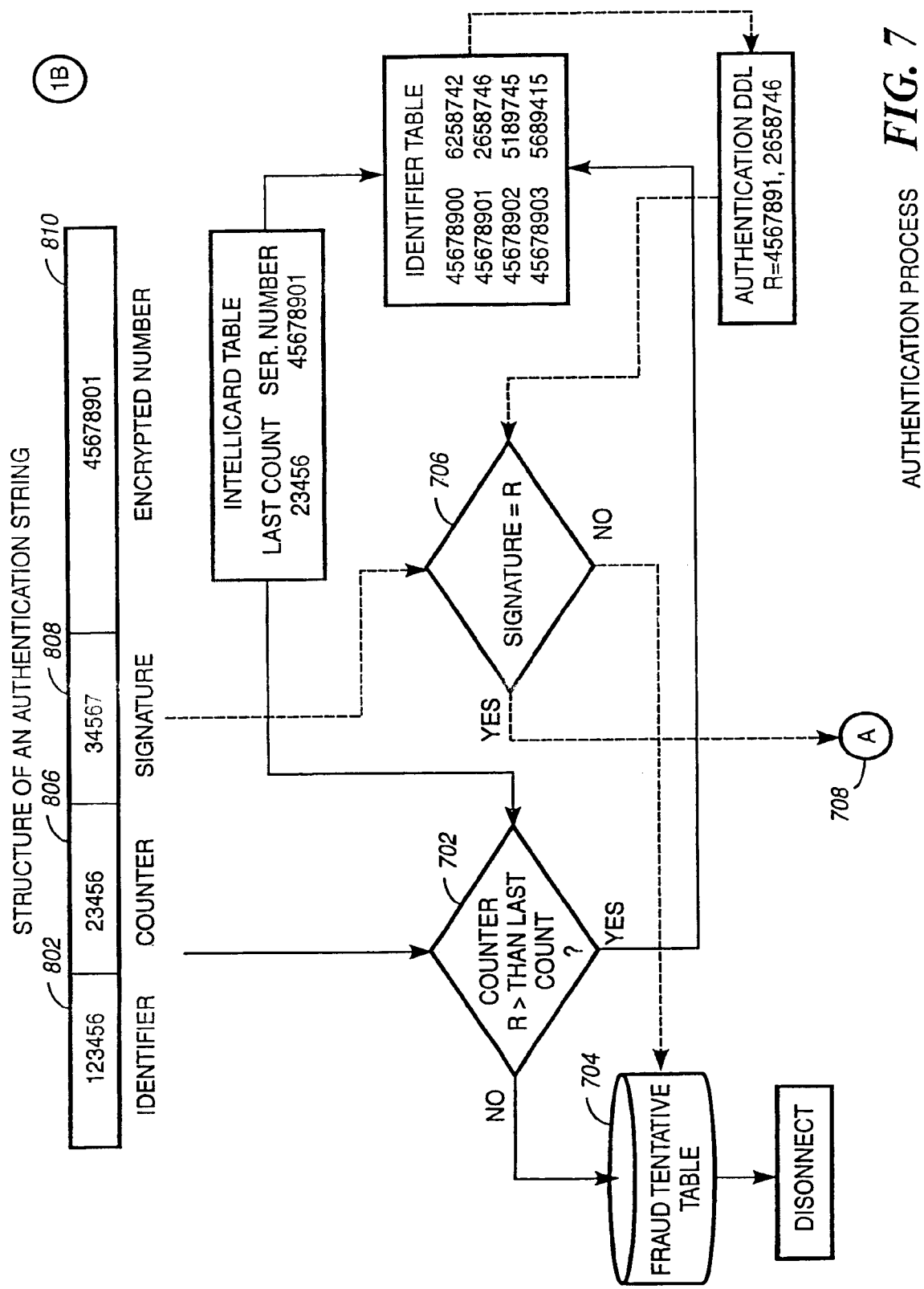
FIG. 7  AUTHENTICATION PROCESS

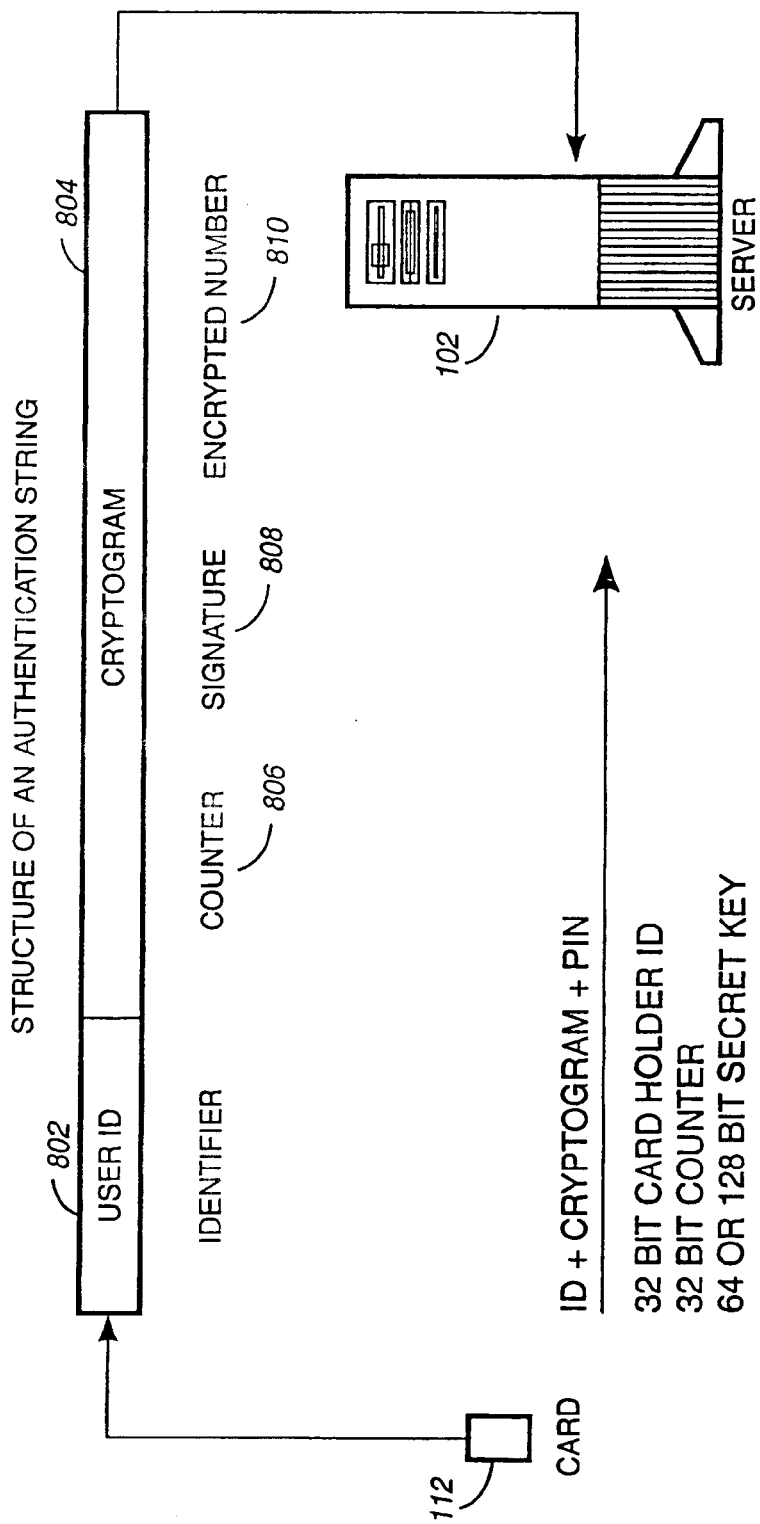
FIG. 8 AUTHENTICATION PROCESS